United States Patent
Enomoto et al.

(10) Patent No.: US 8,948,112 B2
(45) Date of Patent: Feb. 3, 2015

(54) MOBILE COMMUNICATION SYSTEM, BASE STATION APPARATUS, MOBILE STATION APPARATUS, MOBILE COMMUNICATION METHOD, AND INTEGRATED CIRCUIT

(75) Inventors: Masayuki Enomoto, Osaka-shi (JP); Tatsushi Aiba, Osaka-shi (JP)

(73) Assignee: Sharp Kabushiki Kaisha, Osaka (JP)

( * ) Notice: Subject to any disclaimer, the term of this patent is extended or adjusted under 35 U.S.C. 154(b) by 113 days.

(21) Appl. No.: 13/638,419

(22) PCT Filed: Mar. 8, 2011

(86) PCT No.: PCT/JP2011/055377
§ 371 (c)(1), (2), (4) Date: Sep. 28, 2012

(87) PCT Pub. No.: WO2011/122265
PCT Pub. Date: Oct. 6, 2011

(65) Prior Publication Data
US 2013/0022011 A1 Jan. 24, 2013

(30) Foreign Application Priority Data
Mar. 30, 2010 (JP) ................................ 2010-076475

(51) Int. Cl.
*H04W 4/00* (2009.01)
(52) U.S. Cl.
USPC ........................................................ 370/329
(58) Field of Classification Search
CPC ..... H04W 80/04; H04W 88/06; H04W 28/04; H04W 72/04
USPC ................................................ 370/328, 329
See application file for complete search history.

(56) References Cited

U.S. PATENT DOCUMENTS

2009/0204862 A1* 8/2009 Chun et al. .................... 714/748
2009/0245194 A1 10/2009 Damnjanovic et al.
(Continued)

FOREIGN PATENT DOCUMENTS

JP 2009-049539 3/2009
SE WO 2009/157822 * 12/2009

OTHER PUBLICATIONS

Int'l. Search Report issued in Int'l. App. No. PCT/JP2011/055377, mailed Apr. 12, 2011.
(Continued)

*Primary Examiner* — Ronald Abelson
(74) *Attorney, Agent, or Firm* — Greer Burns & Crain, Ltd.

(57) ABSTRACT

Provided are a mobile communication system and a mobile communication method in which a base station apparatus and a mobile station apparatus can efficiently transmit control information in case of communication is conducted by using a wide frequency band constructed by a plurality of component carriers. The mobile communication system in which the base station apparatus and the mobile station apparatus communicate by using the plurality of component carriers, wherein the base station apparatus allocates resources to the mobile station apparatus for transmitting HARQ control information, and the mobile station apparatus uses the allocated resources to transmit to the base station apparatus the HARQ control information for a physical downlink control channel and/or a physical downlink shared channel which are transmitted on a plurality of downlink component carriers, and also a scheduling request for requesting the allocation of uplink data transmission.

24 Claims, 9 Drawing Sheets

(56) References Cited

U.S. PATENT DOCUMENTS

| | | |
|---|---|---|
| 2009/0274100 A1 | 11/2009 | Montojo et al. |
| 2010/0118817 A1* | 5/2010 | Damnjanovic et al. ....... 370/329 |
| 2011/0032887 A1 | 2/2011 | Kishiyama et al. |
| 2011/0141928 A1* | 6/2011 | Shin et al. .................... 370/252 |

OTHER PUBLICATIONS

Carrier Aggregation in LTE-Advanced; TSG-RAN WG1 #53bis R1-082468, Jun. 30-Jul. 4, 2008; Ericsson.

ACK/NACK Transmission Schemes for Carrier Aggregation; 3GPP TSG RAN WG1 Meeting #59bis, R1-100366, Jan. 18-22, 2010; Panasonic.

Basic Approaches on UL ACK/NACK PUCCH design in LTE-Advanced; 3GPP TSG RAN WG1 #60, R1-101348, 1-3 pages, Feb. 22-26, 2010; LG Electronics.

A/N Resource Allocation for PUCCH; 3GPP TSG-RAN WG1 #60, R1-100918, 1-4 pages, Feb. 22-26, 2010; Alcatel-Lucent, Alcatel-Lucent Shanghai Bell.

Performance Comparison of PUCCH ACK/NACK Transmission Schemes for CC Aggregation; 3GPP TSG RAN WG1 Meeting #60, Feb. 22-26, 2010, R1-101418, Nokia Siemens Networks, Nokia.

* cited by examiner

FIG.6

CONFIGURATION OF BIT FIELD (EXAMPLE: 6 BITS)

| CASE OF DLCC NUMBER 3 | | BIT FIELD FOR HARQ CONTROL INFORMATION | | | | BIT FIELD FOR SR |
|---|---|---|---|---|---|---|
| A/A/A | WITHOUT SR | 1 | 1 | 0 | 1 | 0 | 0 |
| A/N/A | WITHOUT SR | 0 | 0 | 1 | 1 | 1 | 0 |
| A/A/N | WITH SR | 1 | 1 | 1 | 1 | 0 | 1 |
| A/N/N | WITH SR | 1 | 0 | 0 | 1 | 0 | 1 |
| A/N/D | WITH SR | 0 | 1 | 1 | 0 | 0 | 1 |
| A/D/D | WITHOUT SR | 0 | 0 | 0 | 0 | 0 | 0 |
| A/D/N | WITH SR | 0 | 0 | 0 | 0 | 1 | 1 |
| N/A/A | WITHOUT SR | 1 | 1 | 1 | 0 | 1 | 0 |
| N/A/N | WITHOUT SR | 1 | 0 | 0 | 1 | 1 | 0 |
| N/N/A | WITH SR | 1 | 0 | 1 | 0 | 1 | 1 |
| N/A/D | WITH SR | 1 | 1 | 0 | 0 | 1 | 1 |
| N/N/D | WITHOUT SR | 0 | 1 | 1 | 1 | 1 | 0 |
| D/A/A | WITHOUT SR | 1 | 0 | 0 | 1 | 0 | 0 |
| D/N/A | WITHOUT SR | 1 | 0 | 0 | 0 | 1 | 0 |
| D/A/N | WITH SR | 0 | 1 | 0 | 0 | 0 | 1 |
| D/N/N | WITH SR | 0 | 0 | 0 | 1 | 1 | 1 |
| D/A/D | WITH SR | 1 | 1 | 1 | 1 | 1 | 1 |
| D/D/A | WITH SR | 1 | 1 | 0 | 0 | 0 | 1 |

A:ACK  N:NACK  D:DTX    SR: SCHEDULING REQUEST

FIG.7

| | | | | | | | | CASE OF DLCC NUMBER 2 | CASE OF DLCC NUMBER 3 |
|---|---|---|---|---|---|---|---|---|---|
| 1 | 1 | 0 | 1 | 0 | 0 | 0 | 0 | A/A WITHOUT SR | |
| 0 | 0 | 1 | 1 | 1 | 0 | 1 | 0 | A/N WITHOUT SR | |
| 1 | 1 | 1 | 1 | 1 | 1 | 1 | 1 | A/D WITHOUT SR | |
| 1 | 0 | 0 | 1 | 0 | 1 | 1 | 1 | N/A WITHOUT SR | |
| 0 | 1 | 1 | 0 | 0 | 1 | 0 | 1 | N/N WITHOUT SR | Not assigned |
| 0 | 0 | 0 | 0 | 0 | 0 | 0 | 0 | N/D WITHOUT SR | |
| 0 | 0 | 0 | 0 | 0 | 0 | 1 | 1 | D/A WITHOUT SR | |
| 1 | 1 | 1 | 1 | 1 | 1 | 0 | 0 | D/N WITHOUT SR | |
| 1 | 0 | 0 | 1 | 1 | 1 | 1 | 0 | D/D WITHOUT SR | |
| 1 | 0 | 1 | 0 | 1 | 1 | 1 | 1 | A/A WITH SR | A/A/D |
| 1 | 1 | 0 | 1 | 0 | 1 | 0 | 1 | A/N WITH SR | A/N/D |
| 0 | 1 | 1 | 1 | 1 | 0 | 1 | 0 | A/D WITH SR | N/A/D |
| 1 | 0 | 0 | 1 | 0 | 0 | 1 | 0 | N/A WITH SR | N/N/D |
| 1 | 0 | 0 | 0 | 1 | 0 | 0 | 0 | N/N WITH SR | D/A/A |
| 0 | 1 | 0 | 0 | 0 | 0 | 1 | 1 | N/D WITH SR | D/A/N |
| 0 | 0 | 0 | 1 | 1 | 1 | 1 | 1 | D/A WITH SR | D/N/A |
| 1 | 1 | 1 | 1 | 1 | 0 | 0 | 1 | D/N WITH SR | D/N/N |
| 1 | 1 | 0 | 0 | 0 | 1 | 0 | 1 | D/D WITH SR | N/A/N |

A:ACK  N:NACK  D:DTX   SR: SCHEDULING REQUEST

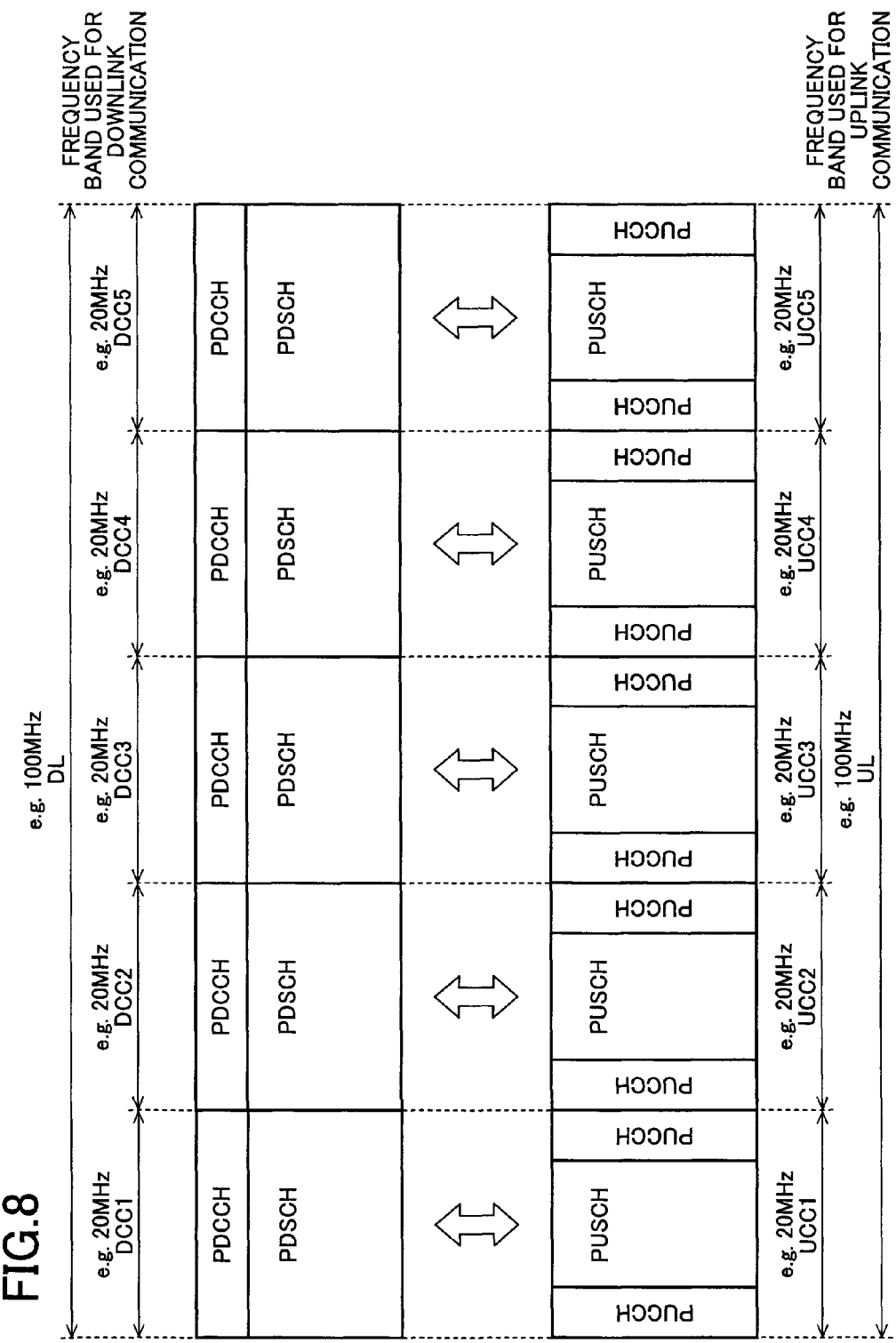

MOBILE COMMUNICATION SYSTEM, BASE STATION APPARATUS, MOBILE STATION APPARATUS, MOBILE COMMUNICATION METHOD, AND INTEGRATED CIRCUIT

This application is a U.S. National Phase under 35 U.S.C. §371 of International Application No. PCT/JP2011/055377, filed Mar. 8, 2011.

TECHNICAL FIELD

The present invention relates to a mobile communication system made up of a base station apparatus and a mobile station apparatus, and a mobile communication method.

BACKGROUND ART

An international standardization project, 3GPP (3rd Generation Partnership Project) is discussing specifications of a network developed from W-CDMA (Wideband-Code Division Multiple Access) and GSM (Global System for Mobile Communications) as a system of next-generation cellular mobile communication.

3GPP has been discussing cellular mobile communication systems for a long time and has standardized the W-CDMA system as a third-generation cellular mobile communication system. HSDPA (High-Speed Downlink Packet Access) with higher communication speed has been standardized and the service is operated. 3GPP is currently also discussing development of the third-generation radio access technology (Long Term Evolution, hereinafter referred to as "LTE") and LTE Advanced (hereinafter referred to as "LTE-A") aimed at further increase in communication speed.

The OFDMA (Orthogonal Frequency Division Multiple Access) method and the SC-FDMA (Single Carrier-Frequency Division Multiple Access) method which perform user-multiplexing using subcarriers that are at right angles to each other are discussed as communication systems in LTE. Specifically, the OFDMA method is a multi-carrier communication method and is proposed for downlink, and the SC-FDMA method is a single-carrier communication method and is proposed for uplink.

On the other hand, for communication methods in LTE-A, it is discussed to introduce the OFDMA method for downlink and the Clustered-SC-FDMA (Clustered-Single Carrier-Frequency Division Multiple Access, also referred to as DFT-s-OFDM with Spectrum Division Control or DFT-precoded OFDM) method for uplink in addition to the SC-FDMA method. The SC-FDMA method and the Clustered-SC-FDMA system proposed as uplink communication methods in LTE and LTE-A are characterized in that PAPR (Peak to Average Power Ratio) at the time of transmission of data (information) can be suppressed to a lower level.

While a typical mobile communication system uses a continuous frequency band, it is discussed for LTE-A to use a plurality of continuous/non-continuous frequency bands (hereinafter referred to as "carrier elements, carrier components (CC)" or "element carriers, component carriers (CC)") in a composite manner to implement operation as one frequency band (a wider frequency band) (frequency band aggregation, also referred to as spectrum aggregation, carrier aggregation, and frequency aggregation). It is also proposed to give different frequency bandwidths to a frequency band used for downlink communication and a frequency band used for uplink communication so that a base station apparatus and a mobile station apparatus more flexibly use a wider frequency band to perform communication (asymmetric frequency band aggregation: asymmetric carrier aggregation) (Non-patent Literature 1).

FIG. 8 is a diagram for explaining frequency band aggregation in a conventional technique. Giving the same bandwidth to a frequency band used for downlink (DL) communication and a frequency band used for uplink (UL) communication as depicted in FIG. 8 is also referred to as symmetric frequency band aggregation (symmetric carrier aggregation). As depicted in FIG. 8, a base station apparatus and a mobile station apparatus use a plurality of component carriers that are continuous/non-continuous frequency bands in a composite manner, thereby performing communication in a wider frequency band made up of a plurality of component carriers. In this case, byway of example, it is depicted that a frequency band used for the downlink communication with a bandwidth of 100 MHz (hereinafter also referred to as a DL system band or a DL system bandwidth) is made up of five component carriers (DCC1: Downlink Component Carrier 1, DCC2, DCC3, DCC4, and DCC5) each having a bandwidth of 20 MHz. By way of example, it is also depicted that a frequency band used for the uplink communication with a bandwidth of 100 MHz (hereinafter also referred to as a UL system band or a UL system bandwidth) is made up of five component carriers (UCC1: Uplink Component Carrier 1, UCC2, UCC3, UCC4, and UCC5) each having a bandwidth of 20 MHz.

In FIG. 8, downlink channels such as a physical downlink control channel (hereinafter, PDCCH) and a physical downlink shared channel (hereinafter, PDSCH) are mapped on each of the downlink component carriers. And the base station apparatus uses the PDCCH to transmit to the mobile station apparatus control information for transmitting a downlink transport block transmitted by using the PDSCH on each of the downlink component carriers (such as resource allocation information, MCS (Modulation and Coding Method) information, and HARQ (Hybrid Automatic Repeat ReQuest) process information) (uses the PDCCH to allocate the PDSCH to the mobile station apparatus) and uses the PDSCH to transmit the downlink transport block to the mobile station apparatus.

Uplink channels such as a physical uplink control channel (hereinafter, PUCCH) and a physical uplink shared channel (hereinafter, PUSCH) are mapped on each of the uplink component carriers. And the mobile station apparatus uses the PUCCH and/or the PUSCH on each of the uplink component carriers to transmit to the base station apparatus control information of HARQ (hereafter described as HARQ control information) for the PDCCH and/or the downlink transport block. The HARQ control information includes a signal (information) indicative of ACK/NACK (Positive Acknowledgement/Negative Acknowledgement, ACK signal or NACK signal) and/or a signal (information) indicative of DTX (Discontinuous Transmission) for the PDCCH and/or the downlink transport block. The DTX is a signal (information) indicating that the mobile station apparatus cannot detect the PDCCH from the base station apparatus (or may be a signal (information) indicative of whether the mobile station apparatus can detect PDCCH). In FIG. 8, any of downlink/uplink channels such as the PDCCH, the PDSCH, the PUCCH, and the PUSCH may not be mapped on some downlink/uplink component carriers.

Similarly, FIG. 9 is a diagram for explaining asymmetric frequency band aggregation in a conventional technique. As depicted in FIG. 9, the base station apparatus and the mobile station apparatus give different bandwidths to a frequency band used for downlink communication and a frequency band used for uplink communication and use component carriers making up these frequency bands in a composite manner, thereby performing communication in a wider frequency band. In this case, byway of example, it is depicted that a frequency band used for the downlink communication with a bandwidth of 100 MHz is made up of five downlink component carriers (DCC1, DCC2, DCC3, DCC4, and DCC5) each having a bandwidth of 20 MHz, and that a frequency band used for the uplink communication with a bandwidth of 40 MHz is made up of two component carriers (UCC1 and UCC2) each having a bandwidth of 20 MHz. In FIG. 9, downlink/uplink channels are mapped on each of the downlink/uplink component carriers. And the base station apparatus uses the PDSCH allocated by the PDCCH to transmit a transport block to the mobile station apparatus. And the mobile station apparatus uses the PUCCH and/or the PUSCH to transmit the HARQ control information to the base station apparatus.

To transmit the HARQ control information for transmission of PDCCHs and/or PDSCHs on a plurality of downlink component carriers, the mobile station apparatus must transmit to the base station apparatus information indicative of ACK, NACK, and DTX for a PDCCH and/or a PDSCH transmitted on each of the component carriers. For example, if the base station apparatus performs transmission of PDCCHs and/or PDSCHs on five downlink component carriers, the mobile station apparatus must supply information indicative as defined in any one of ACK, NACK, and DTX and therefore must transmit information capable of indicating the fifth power of three types of state (243 types of state) to the base station apparatus. To represent these types of state as bit information, eight bits (capable of representing 256 types of state) are required as information bits.

Non-patent Literature 2 proposes a transmission method in which a base station apparatus allocates to a mobile station apparatus a plurality of PUCCH resources for transmission of the HARQ control information such that the mobile station apparatus selects one PUCCH resource from the allocated PUCCH resources to transmit the HARQ control information to the base station apparatus by using the selected PUCCH resource. For example, the base station apparatus allocates to the mobile station apparatus the PUCCH resources corresponding to respective PDSCHs transmitted on a plurality of downlink component carriers and the mobile station apparatus selects one PUCCH resource from a plurality of PUCCH resources to transmit the HARQ control information by using the selected PUCCH resource. The base station apparatus extracts the PUCCH resource selected by the mobile station apparatus in addition to bit information transmitted by the mobile station apparatus so as to transmit/receive information indicative of the HARQ control information between the base station apparatus and the mobile station apparatus.

PRIOR ART DOCUMENTS

Nonpatent Literatures

Non-patent Literature 1: "Carrier aggregation in LTE-Advance", 3GPP TSG RAN WG1 #53bis, R1-082468
Non-patent Literature 2: "ACK/NACK transmission methods for carrier aggregation", 3GPP TSG RAN WG1 #59bis, R1-100366

SUMMARY OF THE INVENTION

Problem to be Solved by the Invention

However, in a conventional technique, a large number of pieces of control information (uplink control information, UCI) must be exchanged between a base station apparatus and a mobile station apparatus in addition to the HARQ control information and these pieces of control information cannot efficiently be transmitted/received.

Since LTE-A involves transmission on a plurality of component carriers, transmission of a large number of pieces of control information is requested and these pieces of control information must efficiently be transmitted/received. However, in a conventional technique, for example, a base station apparatus must frequently allocate both an uplink resource for transmitting the HARQ control information and an uplink resource for transmitting the other control information. For example, if the timing of transmitting the HARQ control information to the base station apparatus coincides with the timing of transmitting the other control information, the mobile station apparatus must suspend (postpone, drop) the transmission of the HARQ control information or the other control information. Specifically, in case of the transmission of pieces of control information is suspended (postponed, dropped), the mobile station apparatus must use an uplink resource of the next timing allocated by the base station apparatus to transmit these pieces of control information. Therefore, a conventional technique has a problem of reduction in throughput of a mobile communication system.

The present invention was conceived in view of the situations and it is therefore an object of the present invention to provide a mobile communication system and a mobile communication method in which the base station apparatus and the mobile station apparatus efficiently transmit the HARQ control information as well as the other control information in case of performing communication by using a wide frequency band made up of a plurality of component carriers, thereby preventing reduction in throughput of the mobile communication system.

Means for Solving the Problem (1) To achieve the object, the present invention has taken the following measures. That is, a mobile communication system of the present invention is a mobile communication system in which a base station apparatus and a mobile station apparatus perform communication by using aggregated component carriers, comprising: the base station apparatus which transmits, to the mobile station apparatus, first information for setting a plurality of physical uplink control channel resources by using a radio resource control signal, the base station apparatus which transmits, to the mobile station apparatus, second information for determining one physical uplink control channel resource from among the plurality of the physical uplink control channel resources by using a physical downlink control channel, the mobile station apparatus which transmits, to the base station apparatus, Hybrid Automatic Repeat Request (HARQ) control information and a scheduling request by using the physical uplink control channel resource determined based on the second information transmitted by using the physical downlink control channel.

(2) A mobile communication system in which a mobile station apparatus transmits, to a base station apparatus, Hybrid Automatic Repeat Request (HARQ) control information for one or a plurality of downlink transport blocks, comprising: the base station apparatus which transmits, to the mobile station apparatus, first information for setting a plurality of physical uplink control channel resources by using a radio resource control signal, the base station apparatus which transmits, to the mobile station apparatus, second information for determining one physical uplink control channel resource from among the plurality of the physical uplink control channel resources by using a physical downlink control channel, the mobile station apparatus which transmits, to the base station apparatus, the HARQ control information and a scheduling request by using the physical uplink control channel resource determined based on the second information transmitted by using the physical downlink control channel (3) A base station apparatus in a mobile communication system in which the base station apparatus and a mobile station apparatus that perform communication by using aggregated component carriers, comprising: a transmitting portion which transmits, to the mobile station apparatus, first information for setting a plurality of physical uplink control channel resources by using a radio resource control signal; the transmitting portion which transmits, to the mobile station apparatus, second information for determining one physical uplink control channel resource from among the plurality of the physical uplink control channel resources by using a physical downlink control channel; and a receiving portion which receives, from the mobile station apparatus Hybrid Automatic Repeat Request (HARQ) control information and a scheduling request by using the physical uplink control channel resource determined based on the second information transmitted by using the physical downlink control channel.

(4) In the above base station apparatus, the HARQ control information includes information indicative of a positive acknowledgement/a negative acknowledgement.

(5) A base station apparatus in a mobile communication system in which a mobile station apparatus transmits, to the base station apparatus, Hybrid Automatic Repeat Request (HARQ) control information for one or a plurality of downlink transport blocks, comprising: a transmitting portion which transmits, to the mobile station apparatus, first information for setting a plurality of physical uplink control channel resources by using a radio resource control signal; the transmitting portion which transmits, to the mobile station apparatus, second information for determining one physical uplink control channel resource from among the plurality of the physical uplink control channel resources by using a physical downlink control channel; and a receiving portion which receives, from the mobile station apparatus, the HARQ control information and a scheduling request by using the physical uplink control channel resource determined based on the second information transmitted by using the physical downlink control channel.

(6) In the above base station apparatus, a bit of the scheduling request is appended at the end of a bit sequence of the HARQ control information.

(7) In the above base station apparatus, the scheduling request is one-bit information indicating that scheduling is requested to the base station apparatus or that scheduling is not requested to the base station apparatus.

(8) In the above base station apparatus, four physical uplink control channel resources are set by the radio resource control signal.

(9) A mobile station apparatus in a mobile communication system in which a base station apparatus and the mobile station apparatus that perform communication by using aggregated component carriers, comprising: a receiving portion which receives, from the base station apparatus, first information for setting a plurality of physical uplink control channel resources by using a radio resource control signal; the receiving portion which receives, from the base station apparatus, second information for determining one physical uplink control channel resource from among the plurality of the physical uplink control channel resources by using a physical downlink control channel; and a transmitting portion which transmits, to the base station apparatus, Hybrid Automatic Repeat Request (HARQ) control information and a scheduling request by using the physical uplink control channel resource determined based on the second information transmitted by using the physical downlink control channel.

(10) In the above mobile station apparatus, the HARQ control information includes information indicative of a positive acknowledgement/a negative acknowledgement.

(11) A mobile station apparatus in a mobile communication system in which the mobile station apparatus transmits, to a base station apparatus, Hybrid Automatic Repeat Request (HARQ) control information for one or a plurality of downlink transport blocks comprising: a receiving portion which receives, from the base station apparatus, first information for setting a plurality of physical uplink control channel resources by using a radio resource control signal; the receiving portion which receives, from the base station apparatus, second information for determining one physical uplink control channel resource from among the plurality of the physical uplink control channel resources by using a physical downlink control channel; and a transmitting portion which transmits, to the base station apparatus, the HARQ control information and a scheduling request by using the physical uplink control channel resource determined based on the second information transmitted by using the physical downlink control channel

(12) In the above mobile station apparatus, a bit of the scheduling request is appended at the end of a bit sequence of the HARQ control information.

(13) In the above mobile station apparatus, the scheduling request is one-bit information indicating that scheduling is requested to the base station apparatus or that scheduling is not requested to the base station apparatus.

(14) In the above mobile station apparatus, four physical uplink control channel resources are set by the radio resource control signal.

(15) A communication method of a base station apparatus in a mobile communication system in which the base station apparatus and a mobile station apparatus perform communication by using aggregated component carriers, comprising: transmitting, to the mobile station apparatus, first information for setting a plurality of physical uplink control channel resources by using a radio resource control signal; transmitting, to the mobile station apparatus, second information for determining one physical uplink control channel resource from among the plurality of the physical uplink control channel resources to by using a physical downlink control channel; and receiving, from the mobile station apparatus, Hybrid Automatic Repeat Request (HARQ) control information and a scheduling request by using the physical uplink control channel resource determined based on the second information transmitted by using the physical downlink control channel.

(16) A communication method of a base station apparatus in a mobile communication system in which a mobile station apparatus transmits, to the base station apparatus, Hybrid Automatic Repeat Request (HARQ) control information for one or a plurality of downlink transport blocks, comprising: transmitting, to the mobile station apparatus, first information for setting a plurality of physical uplink control channel resources by using a radio resource control signal; transmitting, to the mobile station apparatus, second information for determining one physical uplink control channel resource from among the plurality of the physical uplink control channel resources by using a physical downlink control channel; and receiving, from the mobile station apparatus, the HARQ control information and a scheduling request by using the physical uplink control channel resource determined based on the second information transmitted by using the physical downlink control channel.

(17) A communication method of a mobile station apparatus in a mobile communication system in which a base station apparatus and the mobile station apparatus that perform communication by using aggregated component carriers, comprising: receiving, from the base station apparatus, first information for setting a plurality of physical uplink control channel resources by using a radio resource control signal; a step of receiving, from the base station apparatus, second information for determining one physical uplink control channel resource from among the plurality of the physical uplink control channel resources by using a physical downlink control channel; and transmitting, to the base station apparatus, Hybrid Automatic Repeat Request (HARQ) control information and a scheduling request by using the physical uplink control channel resource determined based on the second information transmitted by using the physical downlink control channel.

(18) A communication method of a mobile station apparatus in a mobile communication system in which the mobile station apparatus transmits, to a base station apparatus, Hybrid Automatic Repeat Request (HARQ) control information for one or a plurality of downlink transport blocks, comprising: receiving, from the base station apparatus, first information for setting a plurality of physical uplink control channel resources by using a radio resource control signal; receiving, from the base station apparatus, second information for determining one physical uplink control channel resource from among the plurality of the physical uplink control channel resources by using a physical downlink control channel; and transmitting, to the base station apparatus, the HARQ control information and a scheduling request by using the physical uplink control channel resource determined based on the second information transmitted by using the physical downlink control channel.

(19) An integrated circuit mounted on a base station apparatus in a mobile communication system in which the base station apparatus and a mobile station apparatus that perform communication by using aggregated component carriers, the integrated circuit executing the processes of: transmitting, to the mobile station apparatus, first information for setting a plurality of physical uplink control channel resources by using a radio resource control signal; transmitting, to the mobile station apparatus, second information for determining one physical uplink control channel resource from among the plurality of the physical uplink control channel resources by using a physical downlink control channel; and receiving, from the mobile station apparatus, Hybrid Automatic Repeat Request (HARQ) control information and a scheduling request by using the physical uplink control channel resource determined based on the second information transmitted by using the physical downlink control channel.

(20) An integrated circuit mounted on a base station apparatus in a mobile communication system in which a mobile station apparatus transmits, to the base station apparatus, Hybrid Automatic Repeat Request (HARQ) control information for one or a plurality of downlink transport blocks, the integrated circuit executing the processes of: transmitting, to the mobile station apparatus, first information for setting a plurality of physical uplink control channel resources by using a radio resource control signal; transmitting, to the mobile station apparatus, second information for determining one physical uplink control channel resource from among the plurality of the physical uplink control channel resources by using a physical downlink control channel; and receiving, from the mobile station apparatus, the HARQ control information and a scheduling request by using the physical uplink control channel resource determined based on the second information transmitted by the physical downlink control channel.

(21) An integrated circuit mounted on a mobile station apparatus in a mobile communication system in which a base station apparatus and the mobile station apparatus that perform communication by using aggregated component carriers, the integrated circuit executing the processes of: receiving, from the base station apparatus, first information for setting a plurality of physical uplink control channel resources by using a radio resource control signal; receiving, from the base station apparatus, second information for determining one physical uplink control channel resource from among the plurality of the physical uplink control channel resources by using a physical downlink control channel; and transmitting, to the base station apparatus, Hybrid Automatic Repeat Request (HARQ) control information and a scheduling request by using the physical uplink control channel resource determined based on the second information transmitted by using the physical downlink control channel.

(22) An integrated circuit mounted on a mobile station apparatus in a mobile communication system in which the mobile station apparatus transmits, to a base station apparatus, Hybrid Automatic Repeat Request (HARQ) control information for one or a plurality of downlink transport blocks, the integrated circuit executing the processes of: receiving, from the base station apparatus first information for setting a plurality of physical uplink control channel resources by using a radio resource control signal; receiving, from the base station apparatus, second information for determining one physical uplink control channel resource from among the plurality of the physical uplink control channel resources by using a physical downlink control channel; and transmitting, to the base station apparatus, the HARQ control information and a scheduling request by using the physical uplink control channel resource determined based on the second information transmitted by using the physical downlink control channel.

(23) An integrated circuit mounted on a base station apparatus in a mobile communication system in which the base station apparatus and a mobile station apparatus that perform communication by using a plurality of component carriers which are aggregated, executes processing of transmission of information for setting a plurality of physical uplink control channel resources to the mobile station apparatus by using a radio resource control signal; processing of transmission of information for determining one physical uplink control channel resource from among the plurality of the physical uplink control channel resources to the mobile station apparatus by using a physical downlink control channel; and processing of reception of HARQ control information and a scheduling request from the mobile station apparatus by using the physical uplink control channel resource indicated by the physical downlink control channel.

(24) An integrated circuit mounted on a base station apparatus in a mobile communication system in which a mobile station apparatus that transmits, to the base station apparatus, HARQ control information for one or a plurality of downlink transport blocks transmitted by the base station apparatus in a certain sub-frame, executes processing of transmission of information for setting a plurality of physical uplink control channel resources to the mobile station apparatus by using a radio resource control signal; processing of transmission of information for determining one physical uplink control channel resource from among the plurality of the physical uplink control channel resources to the mobile station apparatus by using a physical downlink control channel; and processing of reception of the HARQ control information and a scheduling request from the mobile station apparatus by using the physical uplink control channel resource indicated by the physical downlink control channel.

(25) An integrated circuit mounted on a mobile station apparatus in a mobile communication system in which a base station apparatus and the mobile station apparatus that perform communication by using a plurality of component carriers which are aggregated, executes processing of reception of information for setting a plurality of physical uplink control channel resources from the base station apparatus by using a radio resource control signal; processing of reception of information for determining one physical uplink control channel resource from among the plurality of the physical uplink control channel resources from the base station apparatus by using a physical downlink control channel; and processing of transmission of HARQ control information and a scheduling request to the base station apparatus by using the physical uplink control channel resource indicated by the physical downlink control channel.

(26) An integrated circuit mounted on a mobile station apparatus in a mobile communication system in which the mobile station apparatus that transmits, to a base station apparatus, HARQ control information for one or a plurality of downlink transport blocks transmitted by the base station apparatus in a certain sub-frame, executes processing of reception of information for setting a plurality of physical uplink control channel resources from the base station apparatus by using a radio resource control signal; processing of reception of information for determining one physical uplink control channel resource from among the plurality of the physical uplink control channel resources from the base station apparatus by using a physical downlink control channel; and processing of transmission of the HARQ control information and a scheduling request to the base station apparatus by using the physical uplink control channel resource indicated by the physical downlink control channel.

Effect of the Invention

The present invention enables the base station apparatus and the mobile station apparatus to efficiently transmit the HARQ control information as well as the other control information in case of performing communication by using a wide frequency band made up of a plurality of component carriers, thereby preventing reduction in throughput of the mobile communication system.

BRIEF DESCRIPTION OF DRAWINGS

FIG. 6 is a diagram of an example of a configuration of a table to which the embodiment of the present invention is applicable.

FIG. 7 is a diagram of another example of a configuration of a table to which the embodiment of the present invention is applicable.

FIG. 8 is a diagram of an example of frequency band aggregation in a conventional technique.

MODES FOR CARRYING OUT THE INVENTION

Figure 1:
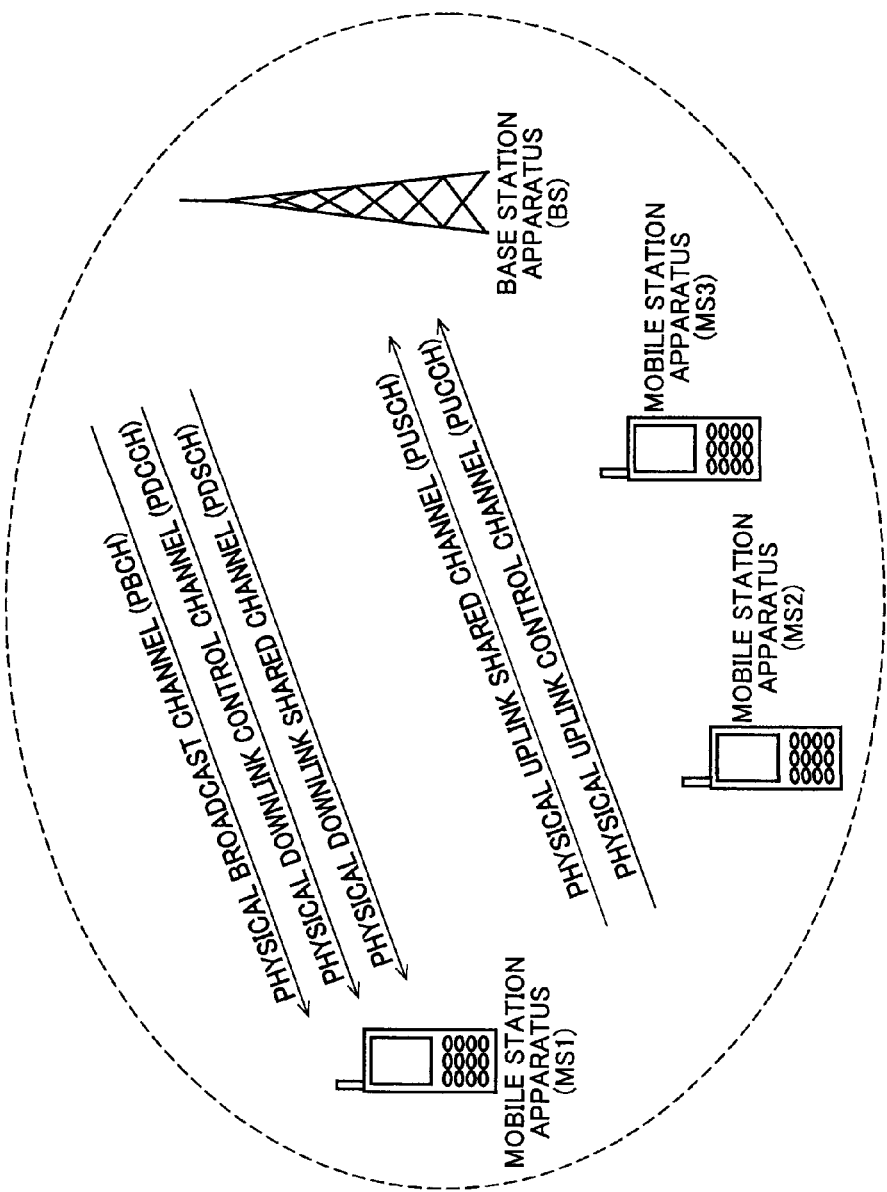
FIG. 1 is a conceptual diagram of a configuration of physical channels according to an embodiment of the present invention.

Embodiments according to the present invention will now be described with reference to the drawings. FIG. 1 is a diagram of one exemplary configuration of channels of an embodiment of the present invention. Downlink physical channels are made up of a physical broadcast channel (PBCH), a PDCCH, a PDSCH, and a physical hybrid ARQ indicator channel (PHICH). Uplink physical channels are made up of a PUSCH and a PUCCH.

The PBCH maps a broadcast channel (BCH) at intervals of 40 milliseconds. Blind detection is performed for the timing of 40 milliseconds. Therefore, explicit signaling is not performed for the presentation of the timing. A sub-frame including the PBCH can be decoded by itself (self-decodable).

The PDCCH is a channel used for transmitting downlink control information. The PDCCH is a channel used for notifying a mobile station apparatus of resource allocation of the PDSCH, and uplink transmission permission that is resource allocation of the PUSCH. The PDCCH is made up of a plurality of CCEs, and a mobile station apparatus detects the PDCCH made up of the CCEs to receive the PDCCH from a base station apparatus. A CCE is made up of a plurality of resource element groups (REGs, also referred to as mini-CCEs) distributed in frequency and time domains. A resource element is a unit resource made up of one OFDM symbol (time component) and one sub-carrier (frequency component) and, for example, an REG is made up of four downlink resource elements consecutive in the frequency domain, except a downlink pilot channel, in the frequency domain in the same OFDM symbol. For example, one PDCCH is made up of one, two, four, and eight CCEs having the consecutive numbers identifying the CCEs (CCE index).

The PDCCH is separately coded (subjected to separate coding) according to a mobile station apparatus and type. That is, a mobile station apparatus detects a plurality of PDCCHs and acquires downlink or uplink resource allocation and information indicative of the other control information. A value of CRC (cyclic redundancy check) is transmitted on each PDCCH and a mobile station apparatus performs CRC for each set of CCEs that may make up a PDCCH and acquires a PDCCH of successful CEC. This is referred to as blind decoding and, with regard to a set of CCEs that may make up a PDCCH subjected to the blind decoding by a mobile station apparatus, the range thereof is referred to as a search space. That is, a mobile station apparatus performs the blind decoding for CCEs in the search space to detect a PDCCH.

If resource allocation of a PDSCH is transmitted on a PDCCH, a mobile station apparatus uses the PDSCH to receive a downlink signal (data) (downlink data (a downlink shared channel (DL-SCH)), and/or downlink control data) in accordance with the resource allocation specified by the PDCCH from a base station apparatus. That is, the PDCCH is used for transmitting a signal performing resource allocation to downlink (hereinafter referred to as "downlink transmission permission signal" or "downlink grant"). If resource allocation of a PUSCH is transmitted on a PDCCH, a mobile station apparatus uses the PUSCH to transmit an uplink signal (data) (uplink data (an uplink shared channel (UL-SCH)), and/or uplink control data) in accordance with the resource allocation specified by the PDCCH from a base station apparatus. Therefore, the PDCCH is used for transmitting a signal permitting data transmission to uplink (hereinafter referred to as "uplink transmission permission signal" or "uplink grant").

The PDSCH is a channel used for transmitting the downlink data (the downlink shared channel (DL-SCH)) or paging information (a paging channel (PCH)). The downlink data (the downlink shared channel (DL-SCH)) indicates transmission of user data, for example, and the DL-SCH is a transport channel. The DL-SCH supports HARQ and dynamic adaptive radio link control. The DL-SCH supports dynamic resource allocation and quasi-static resource allocation.

The PUSCH is a channel mainly used for transmitting the uplink data (the uplink shared channel: UL-SCH). If a base station apparatus schedules a mobile station apparatus, uplink control data (control information, uplink control information) is also transmitted by using the PUSCH. This uplink control data includes channel state information CSI (channel state information or channel statistical information), a downlink channel quality indicator CQI, a precoding matrix indicator PMI, a rank indicator RI, and HARQ control information for transmission of a downlink signal (a downlink transport block). The HARQ control information for transmission of a downlink signal includes information indicative of ACK/NACK and/or information indicative of DTX for PDCCHs and/or downlink transport blocks. The DTX is information indicating that a mobile station apparatus cannot detect the PDCCH from a base station apparatus. In the PUSCH, data is transmitted to a base station apparatus after adding a 24-bit CRC code generated by using a predetermined generating polynomial from data to be transmitted through the PUSCH (uplink transport blocks).

The uplink data (UL-SCH) and the downlink data (DL-SCH) may include a radio resource control signal exchanged between a base station apparatus and a mobile station apparatus (hereinafter referred to as a "RRC signaling: a Radio Resource Control Signaling"), a MAC (Medium Access Control) control elements, etc. The RRC signaling indicates signals exchanged through a higher layer (ratio resource control layer) between a base station apparatus and a mobile station apparatus.

The PUCCH is a channel used for transmitting uplink control data (control information, uplink control information). The uplink control data includes a scheduling request, for example. The scheduling request is used by a mobile station apparatus for requesting UL-SCH resources to a base station apparatus. That is, the mobile station apparatus transmits the scheduling request to the base station apparatus in case of requesting allocation of resources for transmission of uplink data (requesting allocation of resources for transmission through the UL-SCH).

In this case, if the base station apparatus and the mobile station apparatus perform communication by using a plurality of component carriers, the scheduling request is transmitted from the mobile station apparatus in case that the mobile station requests allocation of resources for transmission of uplink data on a plurality of uplink component carriers. In other words, the mobile station apparatus transmits a scheduling request to the base station apparatus so as to make a transmission request on PUSCHs on a plurality of uplink component carriers. In case of receiving the scheduling request from the mobile station apparatus, the base station apparatus allocates resources on a plurality of uplink component carriers to the mobile station apparatus in consideration of a resource status in a managed cell etc.

Figure 9:
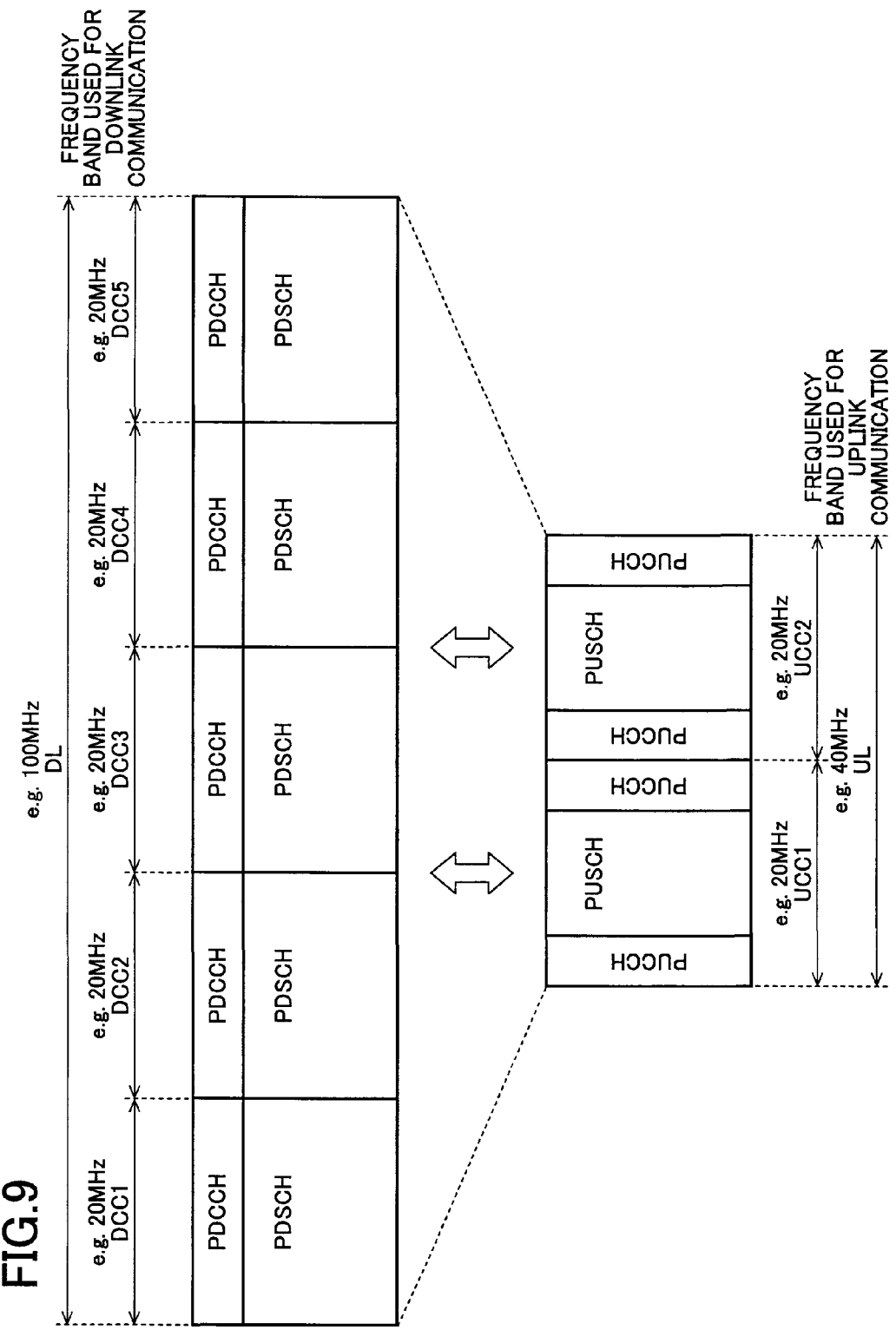
FIG. 9 is a diagram of an example of asymmetric frequency band aggregation in a conventional technique.

That is, for example, in case that a base station apparatus and a mobile station apparatus perform communication by using two uplink component carriers (UCC1 and UCC2 of FIG. 9), the mobile station apparatus transmits a scheduling request to request resources for transmitting uplink data on UCC1 and/or UCC2 from the base station apparatus. In case of receiving the scheduling request from the mobile station apparatus, the base station apparatus allocates resources for transmitting the uplink data on UCC1 and/or UCC2 to the mobile station apparatus in consideration of a resource status in a managed cell etc.

The uplink control data includes the channel state information CSI (channel state information or channel statistical information), the downlink channel quality indicator CQI, the precoding matrix indicator PMI, and the rank indicator RI transmitted (fed back) from the mobile station apparatus to the base station apparatus.

ACK and NACK are used for HARQ. HARQ combines automatic repeat request (ARQ) with error-correcting coding such as turbo coding to provide error control. For example, in the case of HARQ using chaise combining (CC), when an error is detected in a reception packet, retransmission of the completely same packet is requested and these two reception packets are combined to improve reception quality. In the case of HARQ using incremental redundancy (IR), since redundancy bits are divided and the divided bits are sequentially retransmitted bit by bit, a coded rate is reduced as the number of times of retransmission increases, thereby ensuring enhanced error-correcting capability.

On the PUCCH, code spreading is performed in a frequency direction utilizing a CAZAC (Constant Amplitude and Zero Auto-Correlation) sequence having a sequence length of 12 in a frequency direction (12 subcarriers) and a time direction (for estimating a propagation channel) for one schedule unit (two resource blocks). The CAZAC sequence is a sequence having constant amplitude and excellent autocorrelation characteristics in the time and frequency domains. Because of the constant amplitude in the time domain, PAPR (Peak to Average Power Ratio) can be suppressed to a lower level. For example, on the PUCCH, multiplexing of users can be achieved by giving a cyclic shift (cyclic delay) to the CAZAC sequence having a length of 12. When the HARQ control information is transmitted, a block code enables utilization of the code spreading in the time domain and, specifically, a Walsh code having a sequence length of four can be used. As described above, when the HARQ control information is transmitted, PUCCH resources enable the user multiplexing to be achieved by using codes in the same time and frequency resources.

[Configuration of Base Station Apparatus]

Figure 2:
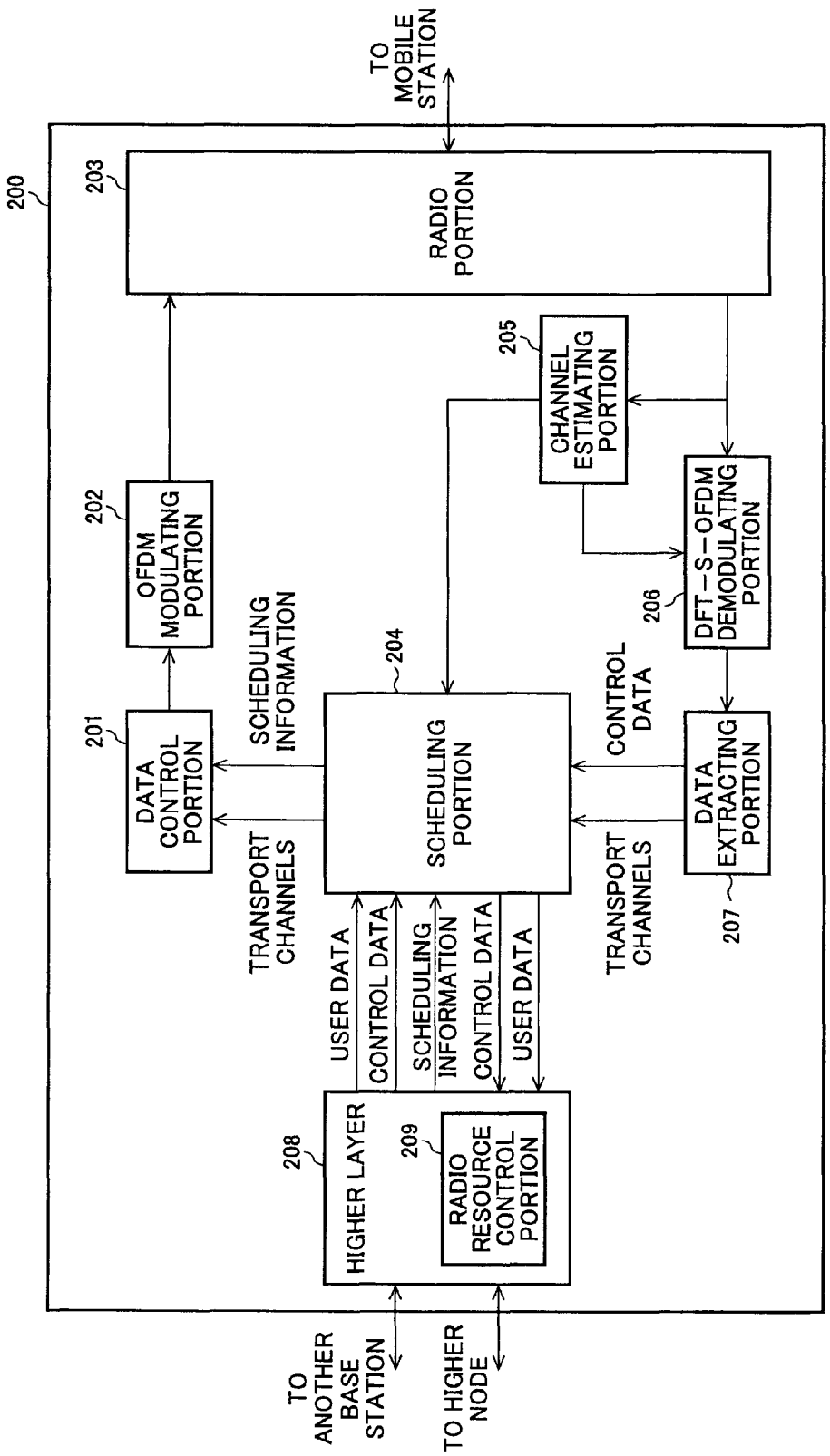
FIG. 2 is a block diagram of a general configuration of a base station apparatus according to the embodiment of the present invention.

FIG. 2 is a block diagram of a general configuration of a base station apparatus 200 according to an embodiment of the present invention. The base station apparatus 200 includes a data control portion 201, an OFDM modulating portion 202, a radio portion 203, a scheduling portion 204, a channel estimating portion 205, a DFT-Spread-OFDM (DFT-S-OFDM) demodulating portion 206, a data extracting portion 207, and a higher layer 208. A receiving portion is made up of the radio portion 203, the scheduling portion 204, the channel estimating portion 205, the DFT-Spread-OFDM (DFT-S-OFDM) demodulating portion 206, the data extracting portion 207, and the higher layer 208, and a transmitting portion is made up of the data control portion 201, the OFDM modulating portion 202, the radio portion 203, the scheduling portion 204, and the higher layer 208.

The radio portion 203, the channel estimating portion 205, the DFT-Spread-OFDM (DFT-S-OFDM) demodulating portion 206, and the data extracting portion 207 execute processing of an uplink physical layer. The radio portion 203, the OFDM modulating portion 202, and the data control portion 201 execute processing of a downlink physical layer.

The data control portion 201 receives transport channels and scheduling information from the scheduling portion 204. The data control portion 201 maps the transport channels as well as signals and channels generated in the physical layer to physical channels based on the scheduling information input from the scheduling portion 204. The data mapped as described above are output to the OFDM modulating portion 202.

The OFDM modulating portion 202 executes OFDM signal processing such as encoding, data modulation, input signal serial/parallel conversion, the IFFT (Inverse Fast Fourier Transform) processing, CP (cyclic prefix) insertion, and filtering for data input from the data control portion 201 to generate and output an OFDM signal to the radio portion 203 based on the scheduling information from the scheduling portion 204 (including downlink physical resource block PRB allocation information (e.g., physical resource block position information such as frequency and time), and a modulation method and a coding method corresponding to each PRB (e.g., 16QAM modulation, ⅔ coding rate)).

The radio portion 203 up-converts the modulated data input from the OFDM modulating portion 202 to a radio frequency to generate and transmit a radio signal via an antenna (not depicted) to a mobile station apparatus 300. The radio portion 203 receives an uplink radio signal from the mobile station apparatus 300 via the antenna (not depicted) and down-converts the signal to a baseband signal to output reception data to the channel estimating portion 205 and the DFT-S-OFDM demodulating portion 206.

The scheduling portion 204 executes processing of a medium access control (MAC) layer. The scheduling portion 204 performs the mapping of logical channels and transport channels, the scheduling of downlink and uplink (such as HARQ processing and selection of transport format), etc.

In the downlink scheduling, the scheduling portion 204 executes a selection processing of a downlink transport format (transmission form) for modulating data (such as allocation of physical resource blocks and a modulating method and a coding method) and provides retransmission control of HARQ, based on uplink feedback information received from the mobile station apparatus 300 (such as downlink channel feedback information (channel state information (channel quality, the number of streams, and precoding information)) and ACK/NACK feedback information for downlink data), information of usable PRBs of mobile station apparatuses, a buffer status, the scheduling information input from the higher layer 208, etc. The scheduling information used for the downlink scheduling is output to the data control portion 201.

In the uplink scheduling, the scheduling portion 204 executes a selection processing of an uplink transport format (transmission form) for modulating data (such as allocation of physical resource blocks and a modulating method and a coding method) based on an estimation result of an uplink channel state (radio propagation channel state) output by the channel estimating portion 205, a resource allocation request from the mobile station apparatus 300, information of usable PRBs of the mobile station apparatuses 300, the scheduling information input from the higher layer 208, etc. The scheduling information used for the uplink scheduling is output to the data control portion 201.

The scheduling portion 204 maps the downlink logical channels input from the higher layer 208 to the transport channels and outputs to the data control portion 201. The scheduling portion 204 processes the control data acquired through uplink and the transport channels input from the data extracting portion 207 as needed and maps the control data and the transport channels to the uplink logical channels and outputs to the higher layer 208.

The channel estimating portion 205 estimates an uplink channel state from an uplink demodulation reference signal (DRS) for the demodulation of uplink data and outputs the estimation result to the DFT-S-OFDM demodulating portion 206. The channel estimating portion 205 also estimates an uplink channel state from an uplink sounding reference signal (SRS) for scheduling the uplink and outputs the estimation result to the scheduling portion 204. Although it is assumed that the uplink communication system is a single carrier system such as DFT-S-OFDM, a multicarrier system such as OFDM system may be used.

Based on the uplink channel state estimation result input from the channel estimating portion 205, the DFT-S-OFDM demodulating portion 206 executes DFT-S-OFDM signal processing such as DFT transform, sub-carrier mapping, IFFT transform, and filtering for the modulated data input from the radio portion 203, executes the demodulating processing and outputs to the data extracting portion 207. If spreading using codes is performed by the mobile station apparatus, the sequence utilized for the spreading is referenced from the scheduling portion 204 and de-spreading is performed based on the sequence.

The data extracting portion 207 checks the correctness of the data input from the DFT-S-OFDM demodulating portion 206 and outputs the confirmation result (acknowledgement signal ACK/negative acknowledgement signal NACK) to the scheduling portion 204. The data extracting portion 207 divides the data input from the DFT-S-OFDM demodulating portion 206 into the transport channels and the control data of the physical layer, which are output to the scheduling portion 204. The divided control data includes uplink feedback information supplied from the mobile station apparatus 300 (a downlink channel feedback report CFR, ACK/NACK feedback information for downlink data).

The higher layer 208 executes processing of a radio resource control (RRC) layer. The higher layer 208 has a radio resource control portion 209 (also referred to as a control portion). The radio resource control portion 209 performs management of various pieces of configuration information, management of system information, management of communication states of mobile station apparatuses, management of migration such as handover, management of buffer status of each mobile station apparatus, etc.

[Configuration of Mobile Station Apparatus]

Figure 3:
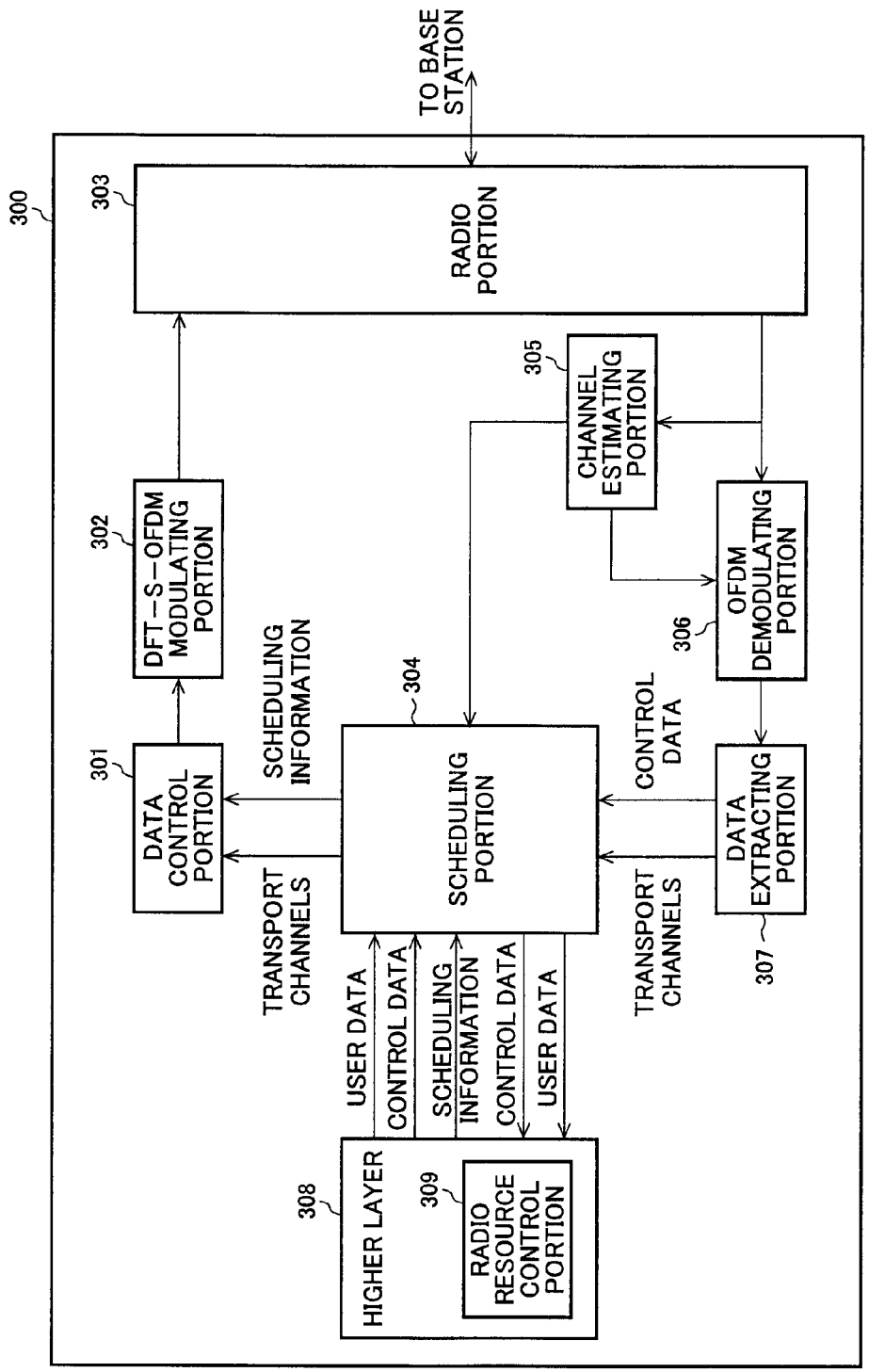
FIG. 3 is a block diagram of a general configuration of a mobile station apparatus according to the embodiment of the present invention.

FIG. 3 is a block diagram of a general configuration of the mobile station apparatus 300 according to the embodiment of the present invention. The mobile station apparatus 300 includes a data control portion 301, a DFT-S-OFDM modulating portion 302, a radio portion 303, a scheduling portion 304, a channel estimating portion 305, an OFDM demodulating portion 306, a data extracting portion 307, and a higher layer 308. A transmitting portion is made up of the data control portion 301, the DFT-S-OFDM modulating portion 302, the radio portion 303, the scheduling portion 304, and the higher layer 308, and a receiving portion is made up of the radio portion 303, the scheduling portion 304, the channel estimating portion 305, the OFDM demodulating portion 306, the data extracting portion 307, and the higher layer 308.

The data control portion 301, the DFT-S-OFDM modulating portion 302, and the radio portion 303 execute processing of the uplink physical layer. The radio portion 303, the channel estimating portion 305, the OFDM demodulating portion 306, and the data extracting portion 307 execute processing of the downlink physical layer.

The data control portion 301 receives transport channels and scheduling information from the scheduling portion 304. The data control portion 301 maps the transport channels as well as signals and channels generated in the physical layer to the physical channels based on the scheduling information input from the scheduling portion 304. The data mapped as described above are output to the DFT-S-OFDM modulating portion 302.

The DFT-S-OFDM modulating portion 302 executes DFT-S-OFDM signal processing such as data modulation, DFT (Discrete Fourier Transform) process, sub-carrier mapping, IFFT (Inverse Fast Fourier Transform) processing, CP insertion, and filtering for the data input from the data control portion 301 to generate and output a DFT-S-OFDM signal to the radio portion 303. Although it is assumed that the uplink communication system is a single carrier system such as DFT-S-OFDM, a multicarrier system such as OFDM system may be used instead. If codes for spreading are supplied from the base station apparatus, the codes may be utilized for spreading to generate a transmission signal.

The radio portion 303 up-converts the modulated data input from the DFT-S-OFDM modulating portion 302 to a radio frequency to generate and transmit a radio signal via an antenna (not depicted) to the base station apparatus 200. The radio portion 303 receives a radio signal modulated with the downlink data from the base station apparatus 200 via the antenna (not depicted) and down-converts the signal to a baseband signal to output the reception data to the channel estimating portion 305 and the OFDM demodulating portion 306.

The scheduling portion 304 executes processing of a medium access control (MAC) layer. The scheduling portion 304 performs the mapping of logical channels and transport channels, the scheduling of downlink and uplink (such as HARQ processing and selection of transport format), etc. In the down link scheduling, the scheduling portion 304 provides the reception control of the transport channels as well as the physical signals and physical channels, and the HARQ retransmission control, based on the scheduling information from the base station apparatus 200 and the higher layer 308 (the transport format and the HARQ retransmission information).

In the uplink scheduling, the scheduling portion 304 executes a scheduling processing for mapping the uplink logical channels input from the higher layer 308 to the transport channels based on an uplink buffer status input from the higher layer 308, the uplink scheduling information from the base station apparatus 200 input from the data extracting portion 307 (the transport format and the HARQ retransmission information), and the scheduling information input from the higher layer 308. For the uplink transport format, the information supplied from the base station apparatus 200 is utilized. The scheduling information is output to the data control portion 301.

The scheduling portion 304 maps the uplink logical channels input from the higher layer 308 to the transport channels before output to the data control portion 301. The scheduling portion 304 also outputs to the data control portion 301 the downlink channel feedback report CFR (channel state information) input from the channel estimating portion 305 and a CRC confirmation result input from the data extracting portion 307. The scheduling portion 304 processes the control data acquired through downlink and the transport channels input from the data extracting portion 307 as needed and maps the control data and the transport channels to the downlink logical channels and outputs to the higher layer 308.

The channel estimating portion 305 estimates a downlink channel state from a downlink reference signal (RS) for the demodulation of downlink data and outputs the estimation result to the OFDM demodulating portion 306. The channel estimating portion 305 estimates a downlink channel state from a downlink reference signal (RS) for notifying the base station apparatus 200 of an estimation result of a downlink channel state (radio propagation channel state) and converts this estimation result into downlink channel state feedback information (such as channel quality information), which is output to the scheduling portion 304.

The OFDM demodulating portion 306 executes the OFDM demodulation processing for the modulated data input from the radio portion 303 based on the downlink channel state estimation result input from the channel estimating portion 305 and outputs the data to the data extracting portion 307.

The data extracting portion 307 performs CRC for the data input from the OFDM demodulating portion 306 to check the correctness and outputs the confirmation result (ACK/NACK feedback information) to the scheduling portion 304. The data extracting portion 307 divides the data input from the OFDM demodulating portion 306 into the transport channels and the control data of the physical layer, which are output to the scheduling portion 304. The divided control data includes the scheduling information such as downlink or uplink resource allocation and uplink HARQ control information.

The higher layer 308 has a radio resource control portion 309. The radio resource control portion 309 performs management of various pieces of configuration information, management of system information, management of communication state of the mobile station, and management of handover etc.

First Embodiment

A first embodiment of a mobile communication system using the base station apparatus and the mobile station apparatus will be described. In the first embodiment, the base station apparatus allocates to the mobile station apparatus a resource for transmission of the HARQ control information by the mobile station apparatus, and the mobile station apparatus uses the allocated resource to transmit to the base station apparatus the HARQ control information for PDCCHs and/or PDSCHs transmitted on a plurality of downlink component carriers as well as a scheduling request requesting allocation of resources for transmission of uplink data.

The base station apparatus allocates to the mobile station apparatus a resource for transmission of the scheduling request by the mobile station apparatus and also allocates to the mobile station apparatus a resource for transmission of the HARQ control information by the mobile station apparatus, and the mobile station apparatus uses the resource for transmission of the control information to transmit to the base station apparatus the HARQ control information for PDCCHs and/or PDSCHs transmitted on a plurality of downlink component carriers as well as the scheduling request requesting allocation of resources for transmission of uplink data.

In this case, the mobile station apparatus refers to one table combining the HARQ control information and the scheduling request. Specifically, the mobile station apparatus refers to one table combining the HARQ control information and the scheduling request and selects a bit sequence corresponding to the HARQ control information and the scheduling request from the referenced table to transmit the selected bit sequence to the base station apparatus.

A table that indicates a bit sequence corresponding to the HARQ control information for PDCCHs and/or PDSCHs on a plurality of downlink component carriers and the scheduling request may be varied depending on the number of the downlink component carriers used for communication. Specifically, a table that indicates of a bit sequence corresponding to the HARQ control information and the scheduling request may be varied depending on the number of the downlink component carriers used for the communication set by the base station apparatus. If the scheduling request is transmitted on a PUSCH, it is assumed that the mobile station apparatus transmits a scheduling request to the base station apparatus in advance and that a PUSCH resource is allocated from the base station apparatus.

Although a frequency band is defined in bandwidth (Hz) in the first embodiment, a frequency band may be defined in the number of resource blocks (RBs) made up of frequency and time. Component carriers (hereinafter also referred to as "carrier components", "element carriers", or "carrier elements") in this embodiment are (narrower) frequency bands aggregated in case that the base station apparatus and the mobile station apparatus perform communication by using a wider frequency band (or a system band). The base station apparatus and the mobile station apparatus can aggregate a plurality of component carriers to make up a wider frequency band and use the plurality of component carriers in a composite manner, thereby realizing high-speed data communication (transmission/reception of information) (frequency band aggregation described above). For example, the base station apparatus and the mobile station apparatus can aggregate five component carriers having a bandwidth of 20 MHz to make up a wider frequency band having a bandwidth of 100 MHz and use these five component carriers in a composite manner to perform communication.

A component carrier indicates each of the (narrower) frequency bands (e.g., the frequency bands having a bandwidth of 20 MHz) making up this wider frequency band (e.g., the frequency band having a bandwidth of 100 MHz). A component carrier also indicates a (center) carrier frequency of each of the (narrower) frequency bands making up this wider frequency band. That is, a downlink component carrier has a band (width) of a portion of the frequency band usable by the base station apparatus and the mobile station apparatus at the time of transmission/reception of a downlink signal, and an uplink component carrier has a band (width) of a portion of the frequency band usable by the base station apparatus and the mobile station apparatus at the time of transmission/reception of an uplink signal. A component carrier may be defined as a constituent unit of a certain physical channel (e.g., a PDCCH, a PDSCH, a PUCCH, and a PUSCH).

Component carriers may be mapped on continuous frequency bands or may be mapped on non-continuous frequency bands, and a wider frequency band is established by aggregating a plurality of component carriers that are continuous and/or non-continuous frequency bands. A frequency band (or a downlink system band or a downlink system bandwidth) used for downlink communication made up of downlink component carriers may not necessarily have the same bandwidth as a frequency band (or an uplink system band or an uplink system bandwidth) used for uplink communication made up of uplink component carriers. Even if the frequency band used for downlink communication and the frequency band used for uplink communication have bandwidths different from each other, the base station apparatus and the mobile station apparatus can use the component carriers in a composite manner to perform communication (asymmetric frequency band aggregation described above).

Figure 4:
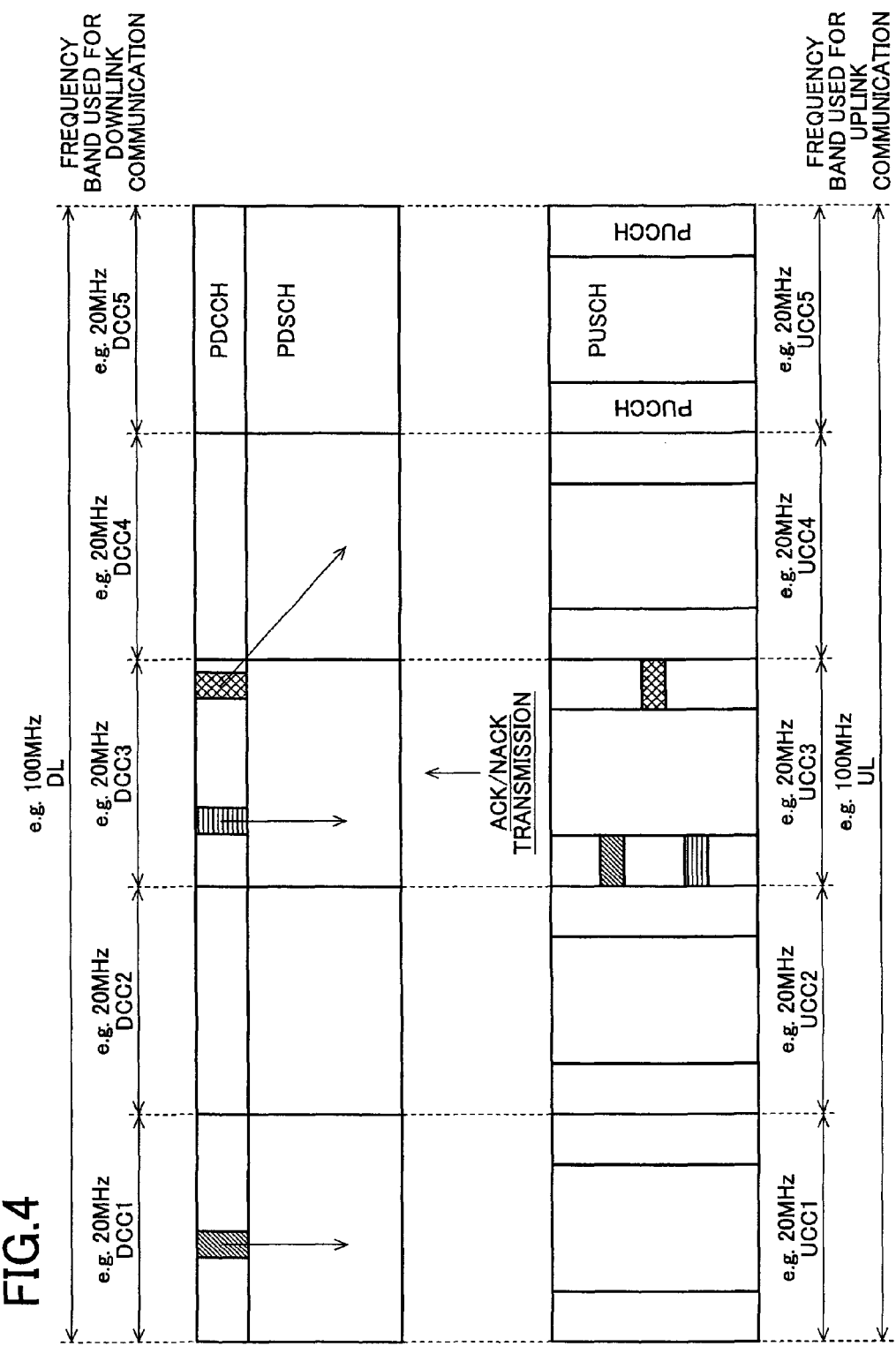
FIG. 4 is a diagram of an example of a mobile communication system to which the embodiment of the present invention is applicable.

FIG. 4 depicts an example of a mobile communication system to which the first embodiment is applicable. FIG. 4 depicts that a frequency band used for downlink communication having a bandwidth of 100 MHz is made up of five downlink component carriers (DCC1, DCC2, DCC3, DCC4, and DCC5) each having a bandwidth of 20 MHz, and that a frequency band used for uplink communication having a bandwidth of 100 MHz is made up of five uplink component carriers (UCC1, UCC2, UCC3, UCC4, and UCC5) each having a bandwidth of 20 MHz. In FIG. 4, downlink/uplink channels are mapped on each of the downlink/uplink component carriers. In FIG. 4, any of downlink/uplink channels such as a PDCCH, a PDSCH, a PUCCH, and a PUSCH may not be mapped on some downlink/uplink component carriers.

In FIG. 4, the base station apparatus can use a PDCCH on a downlink component carrier to allocate a PDSCH. In FIG. 4, by way of example, it is depicted that the base station apparatus uses a PDCCH on DCC1 (a PDCCH indicated by diagonal lines) to allocate a PDSCH on DCC1 (the PDSCH on DCC1 is allocated by the PDCCH indicated by diagonal lines in DCC1).

In FIG. 4, the base station apparatus can transmit to the mobile station a PDCCH on a downlink component carrier along with information representative of a component carrier indicator to allocate a PDSCH on the downlink component carrier same as or different from the downlink component carrier on which the PDCCH is mapped. In FIG. 4, it is depicted that the base station apparatus transmits to the mobile station apparatus a PDCCH indicated by diagonal lines on DCC3 along with information representative of a component carrier indicator indicating that a PDSCH on DCC4 is allocated. The base station apparatus may transmit to the mobile station apparatus a PDCCH indicated by diagonal lines on DCC1 along with information representative of a component carrier indicator indicating that a PDSCH on DCC1 is allocated. The base station apparatus may transmit to the mobile station apparatus a PDCCH indicated by diagonal lines on DCC3 along with information representative of a component carrier indicator indicating that a PDSCH on DCC3 is allocated.

In FIG. 4, the base station apparatus can use a plurality of PDCCHs on downlink component carriers to allocate a plurality of PDSCHs in the same sub-frame. In FIG. 4, by way of example, it is depicted that the base station apparatus uses three PDCCHs on DCC1 and DCC3 (PUCCHs respectively indicated by diagonal lines, grid lines, and mesh lines) to indicate that PDSCHs on DCC1, DCC3, and DCC4 are allocated (the PDSCH on DCC1 is allocated by the PDCCH indicated by diagonal lines on DCC1; the PDSCH on DCC3 is allocated by the PDCCH indicated by grid lines on DCC3; and the PDSCH on DCC4 is allocated by the PDCCH indicated by grid lines on DCC3). The base station apparatus can use the PDSCHs on DCC1, DCC3, and DCC4 to transmit (up to three) downlink transport blocks to the mobile station apparatus in the same sub-frame.

In FIG. 4, the mobile station apparatus use respective PUSCHs on uplink component carriers to transmit a plurality of uplink transport blocks to the base station apparatus in the same sub-frame. For example, the mobile station apparatus uses five PUSCHs on UCC1, UCC2, UCC3, UCC4, and UCC5 to transmit (up to five) uplink transport blocks to the base station apparatus in the same sub-frame.

In FIG. 4, the mobile station apparatus transmits to the base station apparatus the HARQ control information for PDCCH(s) and/or downlink transport block(s) transmitted from the base station apparatus. For example, the mobile station apparatus transmits to the base station apparatus the HARQ control information for five PDCCHs and/or five downlink transport blocks transmitted in the same sub-frame from the base station apparatus.

In FIG. 4, the base station apparatus allocates to the mobile station apparatus a PUCCH resource for transmission of the HARQ control information by the mobile station apparatus. For example, the base station apparatus can use the RRC signaling to allocate to the mobile station apparatus the PUCCH resource for transmission of the HARQ control information by the mobile station apparatus.

For example, the base station apparatus can allocate a PUCCH resource for transmission of the HRQ control information by the mobile station apparatus for each PDSCH transmitted on downlink component carriers. Specifically, the base station apparatus can allocate the PUCCH resource for transmission of the HARQ control information by the mobile station apparatus corresponding to a PDCCH allocating a PDSCH transmitted on a downlink component carrier (e.g., a position of a PDCCH in a PDCCH resource region).

The base station apparatus can set a plurality of PUCCH resources for the mobile station apparatus. And the base station apparatus can indicate one PUCCH resource from among the plurality of the PUCCH resources to allocate the PUCCH resource for transmission of the HARQ control information by the mobile station apparatus. For example, base station apparatus can use the RRC signaling to set a plurality of PUCCH resources. And the base station apparatus can transmit information indicative of one PUCCH resource from among the plurality of the PUCCH resources by using the PDCCH. And the base station apparatus can allocate to the mobile station apparatus the PUCCH resource for transmission of the HARQ control information by the mobile station apparatus.

For example, the base station apparatus can use the RRC signaling to set four PUCCH resources. And the base station apparatus can transmit information indicative of one PUCCH resource from among the four PUCCH resources by using the PDCCH. And the base station apparatus can allocate (indicate) the one PUCCH resource to the mobile station apparatus. Since the base station apparatus allocates the PUCCH resource for transmission of the HARQ control information in this way, the PUCCH resource can flexibly be indicated to the mobile station apparatus.

In FIG. 4, the base station apparatus can use the RRC signaling to allocate to the mobile station apparatus a PUCCH resource for transmission of the scheduling request by the mobile station apparatus. For example, the base station apparatus can periodically allocate to the mobile station apparatus the PUCCH resource for transmission of the scheduling request by the mobile station apparatus. In this case, since the mobile station apparatus transmits the scheduling request by using the PUCCH resource for transmission of the HARQ control information allocated by the base station apparatus, the PUCCH resource periodically allocated by using the RRC signaling can be reduced and a radio resource can efficiently be utilized.

In FIG. 4, the mobile station apparatus uses the PUCCH resource allocated by the base station apparatus to transmit the HARQ control information. Specifically, the mobile station apparatus uses the PUCCH allocated by the base station apparatus to transmit the HARQ control information for PDCCHs and/or PDSCHs (or downlink transport blocks) transmitted on a plurality of downlink component carriers.

In FIG. 4, if the scheduling request is being transmitted to the base station apparatus, the mobile station apparatus can transmit the scheduling request together with the HARQ control information to the base station apparatus. Specifically, the mobile station apparatus can transmit both the HARQ control information and the scheduling request by using the PUCCH resource allocated by the base station apparatus for transmission of the HARQ control information.

That is, the mobile station apparatus can transmit to the base station apparatus the HARQ control information for PDCCHs and/or PDSCHs transmitted on a plurality of downlink component carriers as well as the scheduling request requesting allocation of resources for transmitting uplink data on a plurality of uplink component carriers. In this case, the mobile station apparatus transmits the scheduling request together with the HARQ control information by using the PUCCH resource allocated by the base station apparatus for transmission of the HARQ control information.

Figure 5:
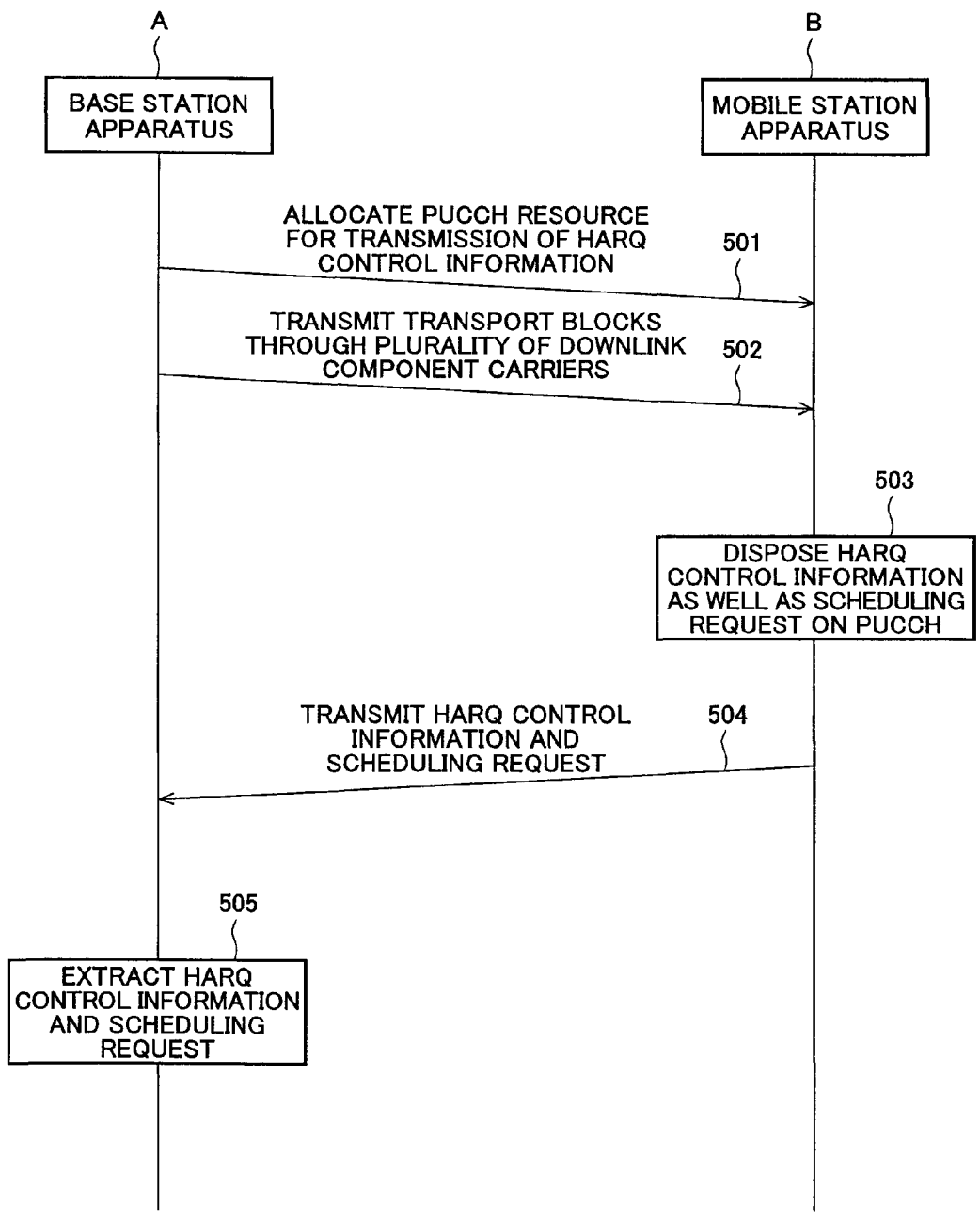
FIG. 5 is a diagram of an example of a sequence chart to which the embodiment of the present invention is applicable.

FIG. 5 is a diagram of a sequence chart in case that the mobile station apparatus transmits the scheduling request together with the HARQ control information to the base station apparatus. First, the base station apparatus allocates to the mobile station apparatus a resource for transmission of the HARQ control information by the mobile station apparatus (501). The base station apparatus may allocate to the mobile station apparatus a resource for transmission of the scheduling request by the mobile station apparatus. For example, the base station apparatus uses the RRC signaling to allocate to the mobile station apparatus a PUCCH resource for transmission of the HARQ control information by the mobile station apparatus. Also, for example, the base station apparatus uses the RRC signaling to allocate to the mobile station apparatus a PUCCH resource for transmission of the scheduling request by the mobile station apparatus. The base station apparatus may dynamically allocate the PUCCH resource depending on a position of a PDCCH transmitted to the mobile station apparatus in a PDCCH resource region. The base station apparatus may use the RRC signaling to set a plurality of PUCCH resources for the mobile station apparatus and may transmit information indicative of one PUCCH resource from among the plurality of the PUCCH resources by using a PDCCH. And the base station apparatus allocates the PUCCH resource to the mobile station apparatus. Although the base station apparatus allocates a PUCCH resource as a resource for transmission of the HARQ control information by the mobile station apparatus in the description of FIG. 5, the base station apparatus may allocate a PUSCH resource as a resource for transmission of the HARQ control information by the mobile station apparatus.

The base station apparatus then uses PDSCHs to transmit downlink transport blocks to the mobile station apparatus (502). For example, the base station apparatus uses PDSCHs on a plurality of downlink component carriers to transmit a plurality of downlink transport blocks to the mobile station apparatus in the same sub-frame. The base station apparatus can use a plurality of PDCCHs to allocate a plurality of PDSCHs to the mobile station apparatus in the same sub-frame.

The base station apparatus can set the (number of) downlink component carriers used for communication to the mobile station apparatus. In FIG. 5, by way of example, it is assumed that the base station apparatus configures the setting for the mobile station apparatus such that communication is performed by using two downlink component carriers. That is, by way of example, it is assumed that the base station apparatus uses respective PDSCHs on two downlink component carriers (i.e., uses two PDSCHs) to transmit two downlink transport blocks to the mobile station apparatus in the same sub-frame.

The downlink component carriers used for communication set by the base station apparatus include downlink component carriers activated by the base station apparatus. Specifically, the base station apparatus can set downlink component carriers used for communication to the mobile station apparatus and can also activate downlink component carriers likely to be scheduled by the base station apparatus. For example, the base station apparatus can use the RRC signaling to set the downlink component carriers used for communication. For example, the base station apparatus can use the MAC signaling to activate the downlink component carriers likely to be scheduled by the base station apparatus. In the following description, for simplicity, it is described that the base station apparatus sets downlink component carriers used for communication; however, these downlink component carriers include downlink component carriers set by the base station apparatus using the RRC signaling, for example. These downlink component carriers also include downlink component carriers activated by the base station apparatus using the MAC signaling, for example.

The mobile station apparatus maps the HARQ control information for the transmission of PDCCHs and/or PDSCHs (or downlink transport blocks) from the base station apparatus and the scheduling request on the resource allocated by the base station apparatus (on the PUCCH resource in this case) (503). The PUCCH resource on which the HARQ control information and the scheduling request are mapped by the mobile station apparatus is the PUCCH resource allocated to the mobile station apparatus by the base station apparatus for transmission of the HARQ control information. The mobile station apparatus generates the HARQ control information based on a reception state of the PDSCHs (or downlink transport blocks) and maps the HARQ control information on the PUCCH.

The mobile station apparatus uses the PUCCH resource allocated by the base station apparatus to transmit the HARQ control information and the scheduling request (504). An error-correcting code may be added to the HARQ control information transmitted from the mobile station apparatus to the base station apparatus. The base station apparatus receives the HARQ control information and the scheduling request transmitted from the mobile station apparatus and extracts these pieces of information (505). If an error-correcting code is added to the HARQ control information transmitted from the mobile station apparatus to the base station apparatus, the base station apparatus performs decoding in accordance with a coding method thereof. The base station apparatus retransmits the downlink transport blocks to the mobile station apparatus based on the extracted information (the HARQ control information). The base station apparatus allocates the resource for transmitting uplink data to the mobile station apparatus based on the extracted information (the scheduling request). The base station apparatus can allocate to the mobile station apparatus the uplink resources on a plurality of uplink component carriers.

That is, the mobile station apparatus uses the PUCCH resource allocated for transmitting the HARQ control information by the base station apparatus to transmit the HARQ control information for PDCCHs and/or PDSCHs transmitted on a plurality of downlink component carriers.

If the scheduling request is being transmitted in this case, the mobile station apparatus transmits the HARQ control information for PDCCHs and/or PDSCHs transmitted on a plurality of downlink component carriers as well as the scheduling request for requesting allocation of resources for transmitting the uplink data on a plurality of uplink component carriers.

Specifically, the mobile station apparatus can transmit both the HARQ control information and the scheduling request even if the HARQ control information is being transmitted at the timing (in the sub-frame) periodically allocated for transmitting the scheduling request by the base station apparatus. If the transmission of the scheduling request coincides in a sub-frame (in a time) with the transmission of the HARQ control information, the mobile station apparatus transmits both the HARQ control information and the scheduling request to the base station apparatus. The mobile station apparatus can use the PUCCH resource allocated for transmitting the HARQ control information by the base station apparatus to transmit both the HARQ control information and the scheduling request to the base station apparatus.

For example, the mobile station apparatus transmits both the HARQ control information and the scheduling request to the base station apparatus by reference to a table combining (in other words, join together, multiplexing, or bundling) the HARQ control information and the (information indicative of) scheduling request. For example, the mobile station apparatus refers to one table combining the HARQ control information and the scheduling request and selects a bit sequence corresponding to the HARQ control information and the (information indicative of) scheduling request to transmit the selected bit sequence to the base station apparatus. That is, the mobile station apparatus can transmit both the HARQ control information and the scheduling request to the base station apparatus by transmitting single bit sequence corresponding to the HARQ control information and the scheduling request to the base station apparatus.

FIG. 6 depicts an example of the table combining the HARQ control information and the (information indicative of) scheduling request. In the table depicted in FIG. 6, by way of example, the HARQ control information and the (information indicative of) scheduling request are represented by (made up of) bit fields of 6 bits. Specifically, in the table depicted in FIG. 6, by way of example, the bit field for the HARQ control information (bit field indicative of the HARQ control information) is represented by a field of 5 bits from the start and the bit field for the (information indicative of) scheduling request is represented by a field of the last one bit. In other words, in the table depicted in FIG. 6, the bit field for the HARQ control information and the bit field for the scheduling request are independently prepared. And the HARQ control information and the scheduling request are mapped to the respective bit fields.

By way of example, the table depicted in FIG. 6 is depicted as a table when the base station apparatus configures the setting for the mobile station apparatus such that communication is performed by using three downlink component carriers. In other words, the table depicted in FIG. 6 is a table that represents of a combination of the HARQ control information and the scheduling request as a bit sequence in case that the number of the downlink component carriers is three (the DLCC number 3). By way of example, the table depicted in FIG. 6 is depicted as a table utilized in case that communication is performed by using three downlink component carriers; however, a different table may be utilized if the base station apparatus and the mobile station apparatus perform communication by using the different number (other than three) of downlink component carriers (e.g., four downlink component carriers).

In the table depicted in FIG. 6, five bits from the start indicate the bit field for the HARQ control information and the last one bit indicates the bit field for the scheduling request (SR). Specifically, for example, in a bit sequence "001110", a bit field "00111" of five bits from the start indicates the HARQ control information and the last one bit "0" indicates the information that indicates of the scheduling request (WITHOUT SR). For example, in a bit sequence "111111", a bit field "11111" of five bits from the start indicates the HARQ control information and a bit field "1" of the last one bit indicates the information indicative of the scheduling request (WITH SR). "WITHOUT SR" indicates that the mobile station apparatus does not request the base station apparatus to allocate UL-SCH resources. "WITH SR" indicates that the mobile station apparatus requests the base station apparatus to allocate UL-SCH resources. That is, the mobile station apparatus can notify the base station apparatus of both states of not requesting the allocation of UL-SCH resource (a negative state) and requesting the allocation of UL-SCH resource (a positive state).

For example, A/N/A in the table of FIG. 6 indicates pieces of the HARQ control information for PDSCHs (or downlink transport blocks) on respective downlink component carriers. In this example, A, N, and D denote ACK, NACK, and DTX, respectively. For example, A/N/A in the table of FIG. 6 indicates ACK for a PDSCH on a certain downlink component carrier (e.g., DCC1), NACK for a PDSCH on a certain downlink component carrier (e.g., DCC2), and ACK for a PDSCH on a certain downlink component carrier (e.g., DCC3).

As described above, in case of transmitting both the HARQ control information and the scheduling request to the base station apparatus, the mobile station apparatus refers to the table as depicted in FIG. 6 and selects a bit sequence corresponding to the HARQ control information and the (information indicative of) scheduling request from the referenced table to transmit the selected bit sequence to the base station apparatus.

For example, if the HARQ control information for PDSCHs (or downlink transport blocks) transmitted on three downlink component carriers (e.g., DCC1, DCC2, and DCC3) by the base station apparatus is A/N/N (e.g., the HARQ control information for the PDSCH transmitted on DCC1 is ACK; the HARQ control information for the PDSCH transmitted on DCC2 is NACK; and the HARQ control information for the PDSCH transmitted on DCC3 is NACK) and "with SR" are being transmitted, the mobile station apparatus transmits a bit sequence "100101" to the base station apparatus.

The table combining the HARQ control information and the scheduling request as depicted in FIG. 6 is defined in advance in accordance with specifications etc. The table as depicted in FIG. 6 may be set by the base station apparatus for the mobile station apparatus by using the RRC signaling, for example. The base station apparatus and the mobile station apparatus can share the table as depicted in FIG. 6 in advance.

Similarly, FIG. 7 depicts an example of the table combining the HARQ control information and the (information indicative of) scheduling request. As is the case with the table depicted in FIG. 6, the HARQ control information (ACK, NACK, and DTX) and the (information indicative of) scheduling request are multiplexed and represented as one bit sequence (8-bit bit sequence in this example) in the table depicted in FIG. 7. That is, one bit sequence (8-bit bit sequence in this example) indicates the HARQ control information and the (information that indicates) scheduling request. The DLCC number 2 in FIG. 7 indicates that the base station apparatus uses two downlink component carriers to perform communication for the mobile station apparatus. The DLCC number 3 in FIG. 7 indicates that the base station apparatus uses three downlink component carriers to perform communication for the mobile station apparatus.

FIG. 7 depicts bit sequences that indicates a combination of the HARQ control information and the scheduling request in (a portion of) the cases when the number of the downlink component carriers used for communication set by the base station apparatus is two and three. A bit length (also referred to as a code word) that indicates the HARQ control information is the same (a bit length of eight bits) regardless of the number of the downlink component carriers.

In FIG. 7, for example, A/N in the case of the number of the downlink component carriers of two indicates the HARQ control information for PDSCHs (or downlink transport blocks) in respective component carriers and indicates ACK for a PDSCH on a certain downlink component carrier (e.g., DCC1) and NACK for a PDSCH on a certain downlink component carrier (e.g., DCC2).

In FIG. 7, for example, A/N/D in the case of the number of the downlink component carriers of three indicates the HARQ control information for PDSCHs (or downlink transport blocks) on respective component carriers and indicates ACK for a PDSCH on a certain downlink component carrier (e.g., DCC1), NACK for a PDSCH on a certain downlink component carrier (e.g., DCC2), and DTX for a PDSCH on a certain downlink component carrier (e.g., DCC3).

In FIG. 7, if the number of the downlink component carriers is two, "WITHOUT SR" and "WITH SR" are assigned to the respective states of the HARQ control information (states from A/A to D/D). If the number of the downlink component carriers is three, bit sequences "10101111" to "11000101" are respectively assigned to A/A/D to N/A/N. These bit sequences are the same bit sequences as "A/A, WITH SR" to "D/D, WITH SR" in the case of the number of the downlink component carriers of two. Although bit sequences "11010000" to "10011110" are not used for indicating the HARQ control information and/or the presence of the SR in the case of the number of the downlink component carriers of three in FIG. 7, these bit sequences may be used for indicating the HARQ control information and/or the presence of the SR.

By indicating unutilized bit sequences as the HARQ control information as well as the scheduling request depending on the number of the downlink component carriers set by the base station apparatus in this way, an amount of information transmitted by the mobile station apparatus can be increased without increasing the number of transmitted bits. The base station apparatus can determine a state of the HARQ control information and the presence of the scheduling request depending on the number of the set (activated) downlink component carriers.

As described above, the transmission/reception of the bit sequences corresponding to the HARQ control information and the scheduling request by the base station apparatus and the mobile station apparatus enables efficient transmission of the HARQ control information as well as the other control information even in case that the base station apparatus and the mobile station apparatus perform communication by using a wider frequency band made up of a plurality of component carriers. The efficient exchange of these pieces of control information between the base station apparatus and the mobile station apparatus enables provision of a mobile communication system and a mobile communication method that take into consideration of ensuring more resources utilized in communication.

A whole or a portion of the base station apparatus and the mobile station apparatus in the embodiments may be implemented as LSI (Large Scale Integration) that is typically an integrated circuit. The functional blocks of the base station apparatus and the mobile station apparatus may individually be formed as chips, or a whole or a portion of the functional blocks may be integrated into a chip. A technique of forming an integrated circuit may be implemented not only in LSI but also in a dedicated circuit or a general purpose processor. If advance in semiconductor technology leads to emergence of a technique of forming an integrated circuit alternative to LSI, the integrated circuit from the technique is also usable.

(1) As described above, the mobile communication system of the present invention is characterized in that, in a mobile communication system in which a base station apparatus and a mobile station apparatus that perform communication by using a plurality of component carriers, the base station apparatus allocates to the mobile station apparatus a resource for transmission of HARQ control information by the mobile station apparatus and that the mobile station apparatus transmits to the base station apparatus the HARQ control information for physical downlink control channels and/or physical downlink shared channels transmitted on a plurality of downlink component carriers as well as a scheduling request requesting allocation for transmission of uplink data, by using the allocated resource.

(2) The mobile communication system is characterized in that, in the mobile communication system in which a base station apparatus and a mobile station apparatus that perform communication by using a plurality of component carriers, the base station apparatus allocates to the mobile station apparatus a resource for transmission of a scheduling request by the mobile station apparatus and allocates to the mobile station apparatus a resource for transmission of HARQ control information by the mobile station apparatus and that the mobile station apparatus transmits to the base station apparatus the HARQ control information for physical downlink control channels and/or physical downlink shared channels transmitted on a plurality of downlink component carriers as well as the scheduling request requesting a resource for transmission of uplink data, by using the resource for transmission of the HARQ control information.

(3) The mobile communication system is characterized in that the mobile station apparatus refers to one table combining the HARQ control information and the scheduling request.

(4) The mobile communication system is characterized in that the mobile station apparatus refers to one table combining the HARQ control information and the scheduling request and selects a bit sequence corresponding to the HARQ control information and the scheduling request from the referenced table to transmit the selected bit sequence to the base station apparatus.

(5) A base station apparatus in a mobile communication system in which the base station apparatus and a mobile station apparatus that perform communication by using a plurality of component carriers is characterized in that the base station apparatus comprises a means for allocating to the mobile station apparatus a resource for transmission of HARQ control information by the mobile station apparatus; and a means for receiving from the mobile station apparatus the HARQ control information for physical downlink control channels and/or physical downlink shared channels transmitted on a plurality of downlink component carriers as well as a scheduling request requesting allocation for transmission of uplink data, by using the allocated resource.

(6) A base station apparatus in a mobile communication system in which the base station apparatus and a mobile station apparatus that perform communication by using a plurality of component carriers is characterized in that the base station apparatus comprises a means for allocating to the mobile station apparatus a resource for transmission of a scheduling request by the mobile station apparatus; a means for allocating to the mobile station apparatus a resource for transmission of HARQ control information by the mobile station apparatus; and a means for receiving from the mobile station apparatus the HARQ control information for physical downlink control channels and/or physical downlink shared channels transmitted on a plurality of downlink component carriers as well as the scheduling request requesting a resource for transmission of uplink data, by using the resource for transmission of the HARQ control information.

(7) A mobile station apparatus in a mobile communication system in which a base station apparatus and the mobile station apparatus that perform communication by using a plurality of component carriers is characterized in that the mobile station apparatus comprises a means for having a resource for transmission of HARQ control information allocated by the base station apparatus; and a means for transmitting to the base station apparatus the HARQ control information for physical downlink control channels and/or physical downlink shared channels transmitted on a plurality of downlink component carriers as well as a scheduling request requesting allocation for transmission of uplink data, by using the allocated resource.

(8) A mobile station apparatus in a mobile communication system in which a base station apparatus and the mobile station apparatus that perform communication by using a plurality of component carriers is characterized in that the mobile station apparatus comprises a means for having a resource for transmission of a scheduling request allocated by the base station apparatus; a means for having a resource for transmission of HARQ control information allocated by the base station apparatus; and a means for transmitting to the base station apparatus the HARQ control information for physical downlink control channels and/or physical downlink shared channels transmitted on a plurality of downlink component carriers as well as the scheduling request requesting a resource for transmission of uplink data, by using the resource for transmission of the HARQ control information.

(9) The mobile station apparatus is characterized in that the means for transmitting to the base station apparatus the HARQ control information as well as the scheduling request refers to one table combining the HARQ control information and the scheduling request.

(10) The mobile station apparatus is characterized in that the means for transmitting to the base station apparatus the HARQ control information as well as the scheduling request refers to one table combining the HARQ control information and the scheduling request and selects a bit sequence corresponding to the HARQ control information and the scheduling request from the referenced table to transmit the selected bit sequence to the base station apparatus.

(11) A communication method of a base station apparatus in a mobile communication system in which the base station apparatus and a mobile station apparatus that perform communication by using a plurality of component carriers is characterized in that the method comprises a step of allocating to the mobile station apparatus a resource for transmission of HARQ control information by the mobile station apparatus; and a step of receiving from the mobile station apparatus the HARQ control information for physical downlink control channels and/or physical downlink shared channels transmitted on a plurality of downlink component carriers as well as a scheduling request requesting allocation for transmission of uplink data, by using the allocated resource.

(12) A communication method of a base station apparatus in a mobile communication system in which the base station apparatus and a mobile station apparatus that perform communication by using a plurality of component carriers is characterized in that the base station apparatus allocates to the mobile station apparatus a resource for transmission of a scheduling request by the mobile station apparatus; allocates to the mobile station apparatus a resource for transmission of HARQ control information; and receives from the mobile station apparatus the HARQ control information for physical downlink control channels and/or physical downlink shared channels transmitted on a plurality of downlink component carriers as well as the scheduling request requesting a resource for transmission of uplink data by using the resource for transmission of the HARQ control information.

(13) A communication method of a mobile station apparatus in a mobile communication system in which a base station apparatus and the mobile station apparatus that perform communication by using a plurality of component carriers is characterized in that a resource for transmission of HARQ control information is allocated by the base station apparatus; and the HARQ control information for physical downlink control channels and/or physical downlink shared channels transmitted on a plurality of downlink component carriers as well as a scheduling request requesting allocation for transmission of uplink data is transmitted to the base station apparatus by using the allocated resource.

(14) A communication method of a mobile station apparatus in a mobile communication system in which a base station apparatus and the mobile station apparatus that perform communication by using a plurality of component carriers is characterized in that a resource for transmission of a scheduling request is allocated by the base station apparatus; a resource for transmission of HARQ control information is allocated by the base station apparatus; and the HARQ control information for physical downlink control channels and/or physical downlink shared channels transmitted on a plurality of downlink component carriers as well as the scheduling request requesting a resource for transmission of uplink data is transmitted to the base station apparatus by using the resource for transmission of the HARQ control information.

(15) The communication method is characterized in that the mobile station apparatus refers to one table combining the HARQ control information and the scheduling request.

(16) The communication method is characterized in that the mobile station apparatus refers to one table combining the HARQ control information and the scheduling request and selects a bit sequence corresponding to the HARQ control information and the scheduling request from the referenced table to transmit the selected bit sequence to the base station apparatus.

(17) An integrated circuit mounted on a base station apparatus and fulfilling a plurality of functions of the base station apparatus is characterized in that the base station apparatus executes a function of allocating to a mobile station apparatus a resource for transmission of HARQ control information by the mobile station apparatus; and a function of receiving from the mobile station apparatus the HARQ control information for physical downlink control channels and/or physical downlink shared channels transmitted on a plurality of downlink component carriers as well as a scheduling request requesting allocation for transmission of uplink data by using the allocated resource.

(18) An integrated circuit mounted on a mobile station apparatus and fulfilling of the mobile station apparatus a plurality of functions is characterized in that the mobile station apparatus executes a function of having a resource for transmission of HARQ control information allocated by a base station apparatus; and a function of transmitting to the base station apparatus the HARQ control information for physical downlink control channels and/or physical downlink shared channels transmitted on a plurality of downlink component carriers as well as a scheduling request requesting allocation for transmission of uplink data, by using the allocated resource.

EXPLANATIONS OF LETTERS OR NUMERALS

200 . . . base station apparatus;
201 . . . data control portion;
202 . . . OFDM modulating portion;
203 . . . radio portion;
204 . . . scheduling portion;
205 . . . channel estimating portion;
206 . . . DFT-S-OFDM demodulating portion;
207 . . . data extracting portion;
208 . . . higher layer;
209 . . . radio resource control portion;
300 . . . mobile station apparatus;
301 . . . data control portion;
302 . . . DFT-S-OFDM modulating portion;
303 . . . radio portion;
304 . . . scheduling portion;
305 . . . channel estimating portion;
306 . . . OFDM demodulating portion;
307 . . . data extracting portion;
308 . . . higher layer; and
309 . . . radio resource control portion.

The invention claimed is:
1. A base station apparatus which communicates with a mobile station apparatus using a plurality of component carriers, the base station apparatus comprising:
a transmitting unit configured to:
transmit using a higher layer signal, to the mobile station apparatus, first information used for configuring a physical uplink control channel resource;
transmit using the higher layer signal, to the mobile station apparatus, second information used for configuring a plurality of physical uplink control channel resources;
transmit using a physical downlink control channel, to the mobile station apparatus, third information used for determining one physical uplink control channel resource from among the plurality of physical uplink control channel resources; and a receiving unit configured to:
receive in a sub-frame, from the mobile station apparatus, a scheduling request using the physical uplink control channel resource configured based on the first information;
receive in a sub-frame, from the mobile station apparatus, Hybrid Automatic Repeat Request (HARQ) control information using the one physical uplink control channel resource determined based on the second information and the third information; wherein
in a case that a reception of the HARQ control information using the one physical uplink control channel resource determined based on the second information and the third information coincides with a sub-frame for a reception of the scheduling request, the receiving unit is configured to receive in the sub-frame for the reception of the scheduling request, the HARQ control information and the scheduling request using the one physical uplink control channel resource determined based on the second information and the third information.

2. The base station apparatus as defined in claim 1, wherein the HARQ control information includes information indicative of a positive acknowledgement or a negative acknowledgement.

3. The base station apparatus as defined in claim 1, wherein a bit of the scheduling request is appended at the end of a bit sequence of the HARQ control information.

4. The base station apparatus as defined in claim 1, wherein the scheduling request is one-bit information indicating that a scheduling is requested or that the scheduling is not requested.

5. The base station apparatus as defined in claim 1, wherein the plurality of physical uplink control channel resources configured using the second information are four physical uplink control channel resources.

6. A base station apparatus in a mobile communication system in which a mobile station apparatus transmits, to the base station apparatus, Hybrid Automatic Repeat Request (HARQ) control information for one or more of downlink transport blocks, the base station apparatus comprising:
a transmitting unit configured to:
transmit using a higher layer signal, to the mobile station apparatus, first information used for configuring a physical uplink control channel resource;
transmit using the higher layer signal, to the mobile station apparatus, second information used for configuring a plurality of physical uplink control channel resources;
transmit using a physical downlink control channel, to the mobile station apparatus, third information used for determining one physical uplink control channel resource from among the plurality of physical uplink control channel resources; and
a receiving unit configured to:
receive in a sub-frame, from the mobile station apparatus, a scheduling request using the physical uplink control channel resource configured based on the first information;
receive in a sub-frame, from the mobile station apparatus, the HARQ control information using the one physical uplink control channel resource determined based on the second information and the third information; wherein
in a case that a reception of the HARQ control information using the one physical uplink control channel resource determined based on the second information and the third information coincides with a sub-frame for a reception of the scheduling request, the receiving unit is configured to receive in the sub-frame for the reception of the scheduling request, the HARQ control information and the scheduling request using the one physical uplink control channel resource determined based on the second information and the third information.

7. The base station apparatus as defined in claim 6, wherein a bit of the scheduling request is appended at the end of a bit sequence of the HARQ control information.

8. The base station apparatus as defined in claim 6, wherein the scheduling request is one-bit information indicating that a scheduling is requested or that the scheduling is not requested.

9. The base station apparatus as defined in claim 6, wherein the plurality of physical uplink control channel resources configured using the second information are four physical uplink control channel resources.

10. The base station apparatus as defined in claim 6, wherein the HARQ control information includes information indicative of a positive acknowledgement or a negative acknowledgement.

11. A mobile station apparatus which communicates with a base station apparatus using a plurality of component carriers, the mobile station apparatus comprising:
a receiving unit configured to:
receive using a higher layer signal, from the base station apparatus, first information used for configuring a physical uplink control channel resource;
receive using the higher layer signal, from the base station apparatus, second information used for configuring a plurality of physical uplink control channel resources;
receive using a physical downlink control channel, from the base station apparatus, third information used for determining one physical uplink control channel resource from among the plurality of physical uplink control channel resources; and
a transmitting unit configured to:
transmit in a sub-frame, to the base station apparatus, a scheduling request using the physical uplink control channel resource configured based on the first information;
transmit in a sub-frame, to the base station apparatus, Hybrid Automatic Repeat Request (HARQ) control information using the one physical uplink control channel resource determined based on the second information and the third information; wherein
in a case that a transmission of the HARQ control information using the one physical uplink control channel resource determined based on the second information and the third information coincides with a sub-frame for a transmission of the scheduling request, the transmitting unit is configured to transmit in the sub-frame for the transmission of the scheduling request, to the base station apparatus, the HARQ control information and the scheduling request using the one physical uplink control channel resource determined based on the second information and the third information.

12. The mobile station apparatus as defined in claim 11, wherein the HARQ control information includes information indicative of a positive acknowledgement or a negative acknowledgement.

13. The mobile station apparatus as defined in claim 11, wherein a bit of the scheduling request is appended at the end of a bit sequence of the HARQ control information.

14. The mobile station apparatus as defined in claim 11, wherein
the scheduling request is one-bit information indicating that a scheduling is requested or that the scheduling is not requested.

15. The mobile station apparatus as defined in claim 11, wherein
the plurality of physical uplink control channel resources configured using the second information are four physical uplink control channel resources.

16. A mobile station apparatus in a mobile communication system in which the mobile station apparatus transmits, to a base station apparatus, Hybrid Automatic Repeat Request (HARQ) control information for one or more downlink transport blocks, the mobile station apparatus comprising:
a receiving unit configured to:
receive using a higher layer signal, from the base station apparatus, first information used for configuring a physical uplink control channel resource;
receive using the higher layer signal, from the base station apparatus, second information used for configuring a plurality of physical uplink control channel resources;
receive using a physical downlink control channel, from the base station apparatus, third information used for determining one physical uplink control channel resource from among the plurality of physical uplink control channel resources; and
a transmitting unit configured to:
transmit in a sub-frame, to the base station apparatus, a scheduling request using the physical uplink control channel resource configured based on the first information;
transmit in a sub-frame, to the base station apparatus, the HARQ control information using the one physical uplink control channel resource determined based on the second information and the third information; wherein
in a case that a transmission of the HARQ control information using the one physical uplink control channel resource determined based on the second information and the third information coincides with a sub-frame for a transmission of the scheduling request, the transmitting unit is configured to transmit in the sub-frame for the transmission of the scheduling request, to the base station apparatus, the HARQ control information and the scheduling request using the one physical uplink control channel resource determined based on the second information and the third information.

17. The mobile station apparatus as defined in claim 16, wherein
a bit of the scheduling request is appended at the end of a bit sequence of the HARQ control information.

18. The mobile station apparatus as defined in claim 16, wherein
the scheduling request is one-bit information indicating that a scheduling is requested or that the scheduling is not requested.

19. The mobile station apparatus as defined in claim 16, wherein
the HARQ control information includes information indicative of a positive acknowledgement or a negative acknowledgement.

20. The mobile station apparatus as defined in claim 16, wherein
the plurality of physical uplink control channel resources configured using the second information are four physical uplink control channel resources.

21. An integrated circuit mounted on a base station apparatus which communicates with a mobile station apparatus using a plurality of component carriers, the integrated circuit executing the processes of:
transmitting using a higher layer signal, to the mobile station apparatus, first information used for configuring a physical uplink control channel resource;
transmitting using the higher layer signal, to the mobile station apparatus, second information used for configuring a plurality of physical uplink control channel resources;
transmitting using a physical downlink control channel, to the mobile station apparatus, third information used for determining one physical uplink control channel resource from among the plurality of physical uplink control channel resources; and
receiving in a sub-frame, from the mobile station apparatus, a scheduling request using the physical uplink control channel resource configured based on the first information;
receiving in a sub-frame, from the mobile station apparatus, Hybrid Automatic Repeat Request (HARQ) control information using the one physical uplink control channel determined based on the second information and the third information;
in a case that a reception of the HARQ control information using the one physical uplink control channel resource determined based on the second information and the third information coincides with a sub-frame for a reception of the scheduling request, the receiving unit is configured to receive in the sub-frame for the reception of the scheduling request, the HARQ control information and the scheduling request using the one physical uplink control channel resource determined based on the second information and the third information.

22. An integrated circuit mounted on a base station apparatus in a mobile communication system in which a mobile station apparatus transmits, to the base station apparatus, Hybrid Automatic Repeat Request (HARQ) control information for one or more downlink transport blocks, the integrated circuit executing the processes of:
transmitting using a higher layer signal, to the mobile station apparatus, first information used for configuring a physical uplink control channel resource;
transmitting using the higher layer signal, to the mobile station apparatus, second information used for configuring a plurality of physical uplink control channel resources;
transmitting using a physical downlink control channel, to the mobile station apparatus, third information used for determining one physical uplink control channel resource from among the plurality of physical uplink control channel resources; and
receiving in a sub-frame, from the mobile station apparatus, a scheduling request using the physical uplink control channel resource configured based on the first information;
receiving in a sub-frame, from the mobile station apparatus, the HARQ control information using the one physical uplink control channel resource determined based on the second information and the third information;
in a case that a reception of the HARQ control information using the one physical uplink control channel resource determined based on the second information and the third information coincides with a sub-frame for a reception of the scheduling request, the receiving unit is configured to receive in the sub-frame for the reception of the scheduling request, the HARQ control information and the scheduling request using the one physical uplink control channel resource determined based on the second information and the third information.

23. An integrated circuit mounted on a mobile station apparatus which communicates with a base station apparatus using a plurality of component carriers, the integrated circuit executing the processes of:
- receiving using a higher layer signal, from the base station apparatus, first information used for configuring a physical uplink control channel resource;
- receiving using the higher layer signal, from the base station apparatus, second information used for configuring a plurality of physical uplink control channel resources;
- receiving using a physical downlink control channel, from the base station apparatus, third information used for determining one physical uplink control channel resource from among the plurality of physical uplink control channel resources; and
- transmitting in a sub-frame, to the base station apparatus, a scheduling request using the physical uplink control channel resource configured based on the first information;
- transmitting in a sub-frame, to the base station apparatus, Hybrid Automatic Repeat Request (HARQ) control information using the one physical uplink control channel resource determined based on the second information and the third information;
- in a case that a transmission of the HARQ control information using the one physical uplink control channel resource determined based on the second information and the third information coincides with a sub-frame for a transmission of the scheduling request, transmitting in the sub-frame for the transmission of the scheduling request, to the base station apparatus, the HARQ control information and the scheduling request using the one physical uplink control channel resource determined based on the second information and the third information.

24. An integrated circuit mounted on a mobile station apparatus in a mobile communication system in which the mobile station apparatus transmits, to a base station apparatus, Hybrid Automatic Repeat Request (HARQ) control information for one or more downlink transport blocks, the integrated circuit executing the processes of:
- receiving using a higher layer signal, from the base station apparatus, first information used for configuring a physical uplink control channel resource;
- receiving using the higher layer signal, from the base station apparatus, second information used for configuring a plurality of physical uplink control channel resources;
- receiving using a physical downlink control channel, from the base station apparatus, third information used for determining one physical uplink control channel resource from among the plurality of physical uplink control channel resources; and
- transmitting in a sub-frame, to the base station apparatus, a scheduling request using the physical uplink control channel resource configured based on the first information;
- transmitting in a sub-frame, to the base station apparatus, the HARQ control information using the one physical uplink control channel resource determined based on the second information and the third information;
- in a case that a transmission of the HARQ control information using the one physical uplink control channel resource determined based on the second information and the third information coincides with a sub-frame for a transmission of the scheduling request, transmitting in the sub-frame for the transmission of the scheduling request, to the base station apparatus, the HARQ control information and the scheduling request using the one physical uplink control channel resource determined based on the second information and the third information.

* * * * *